United States Patent [19]

Hartelius et al.

[11] Patent Number: 4,843,973
[45] Date of Patent: Jul. 4, 1989

[54] RAILCAR MOVING VEHICLES

[76] Inventors: Marshall V. Hartelius, 103 Spring Valley Dr.; Victor H. Ames, 17 Pine Cove West, both of La Grange, Ga. 30240

[21] Appl. No.: 125,768

[22] Filed: Nov. 23, 1987

Related U.S. Application Data

[63] Continuation of Ser. No. 810,835, Dec. 19, 1985, abandoned, which is a continuation of Ser. No. 462,316, Jan. 31, 1983, abandoned.

[51] Int. Cl.⁴ .......................... B61C 9/08; B61C 11/00
[52] U.S. Cl. .................................. 105/26.1; 105/72.2; 105/215.2
[58] Field of Search .................. 105/215.1, 215.2, 26.1, 105/73, 72.2; 180/242

[56] References Cited

U.S. PATENT DOCUMENTS

| | | | |
|---|---|---|---|
| 1,274,102 | 7/1918 | Srakula | 105/215 C |
| 3,019,742 | 2/1962 | Kershaw | 105/215 C |
| 3,134,343 | 5/1964 | Matsumura | 105/215 C |
| 3,338,184 | 8/1967 | Fisher | 105/215 C |
| 4,089,384 | 5/1978 | Ehrenberg | 180/242 X |
| 4,113,114 | 9/1978 | Pounds | 105/73 X |
| 4,167,142 | 9/1979 | Ames | 105/215 C X |
| 4,355,584 | 10/1982 | White, Jr. | 105/215 C |
| 4,534,297 | 8/1985 | Johnson, Sr. | 105/215 C |
| 4,537,137 | 8/1985 | White, Jr. | 105/215.2 |

Primary Examiner—Johnny D. Cherry
Assistant Examiner—Joseph D. Pape
Attorney, Agent, or Firm—Lockwood, Alex, FitzGibbon & Cummings

[57] ABSTRACT

An improved railcar moving vehicle is capable of travel in a first rail travel mode on a railway track on rail wheels and in a second ground travel mode on ground wheels. When the rail wheels are driving the vehicle on the rails in the rail travel mode, further traction assist is achieved by lowering powered ones of the ground wheels so as to frictionally engage either the surface of the rail bed or the rails themselves with sufficient force to drivingly increase the traction of the vehicle in the rail travel mode. The powered ground wheels are preferably driven independently of each other and of the rail wheel sets in two of the preferred embodiments by independent hydrostatic motors. In the other preferred embodiment, the ground wheels are powered from the rail wheels.

20 Claims, 14 Drawing Sheets

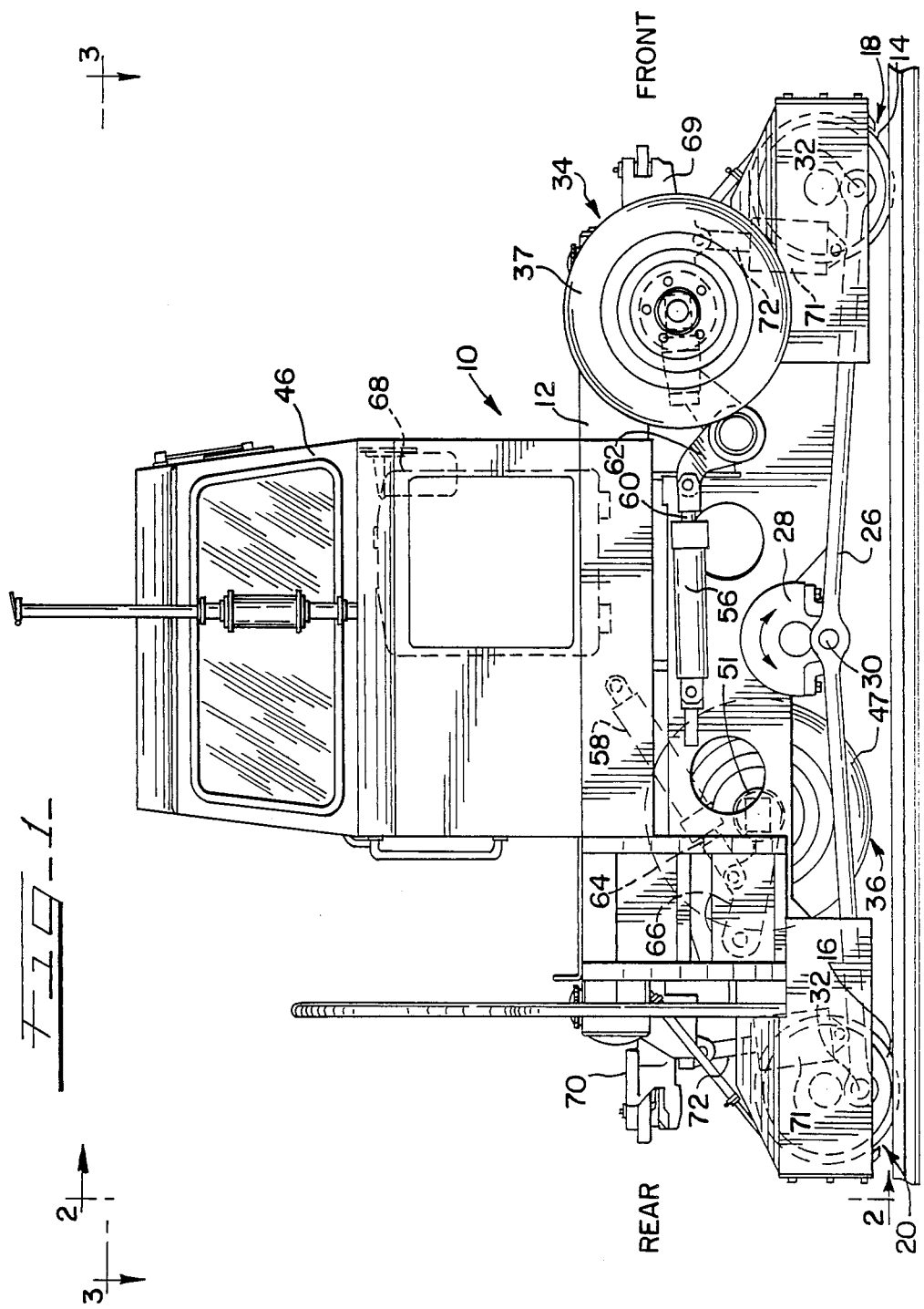

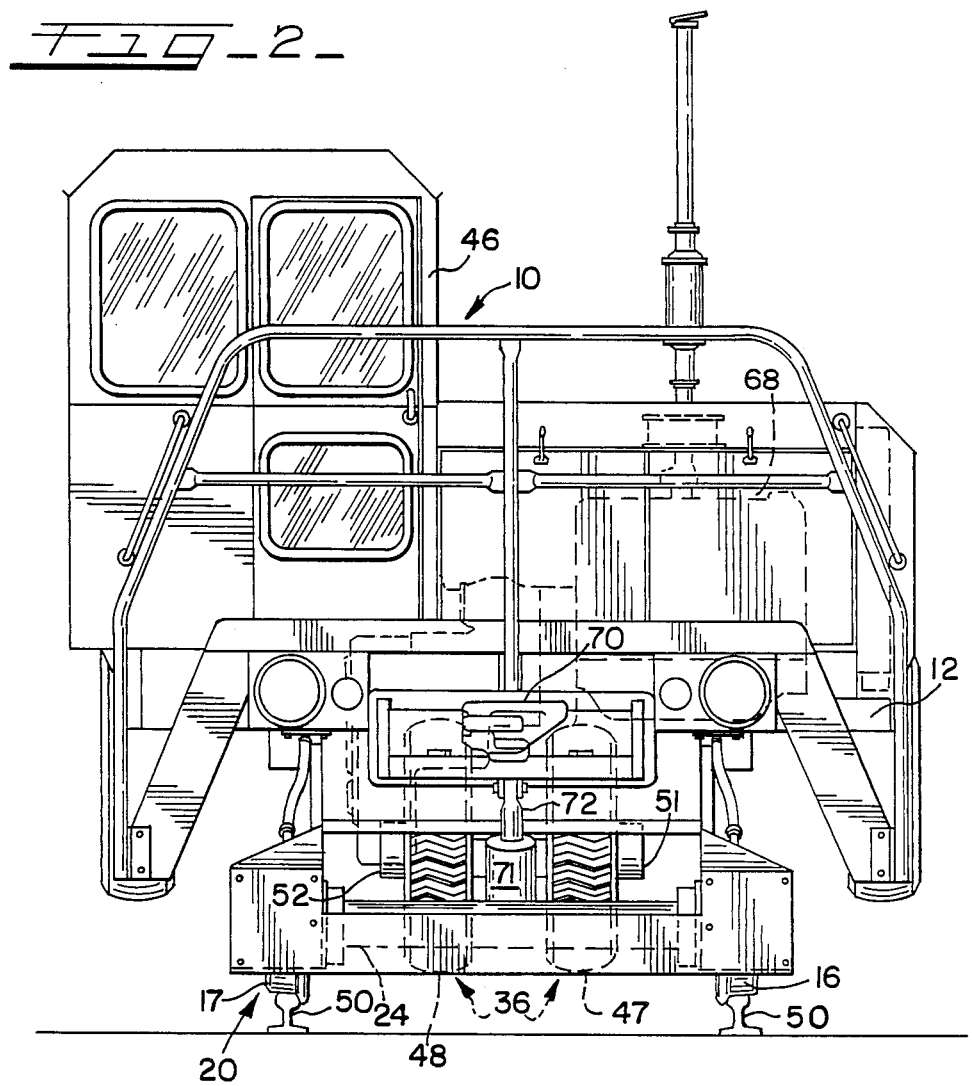

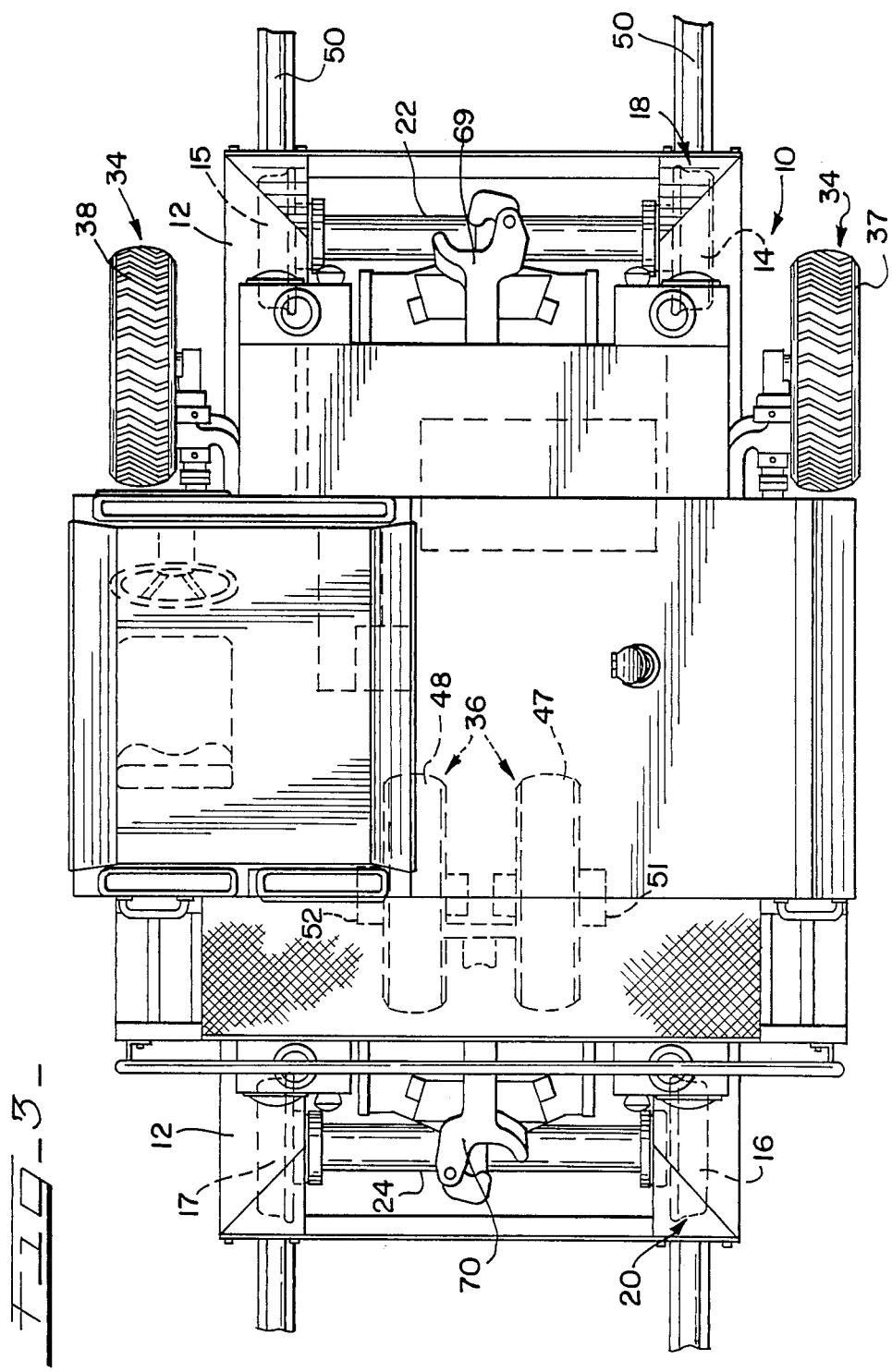

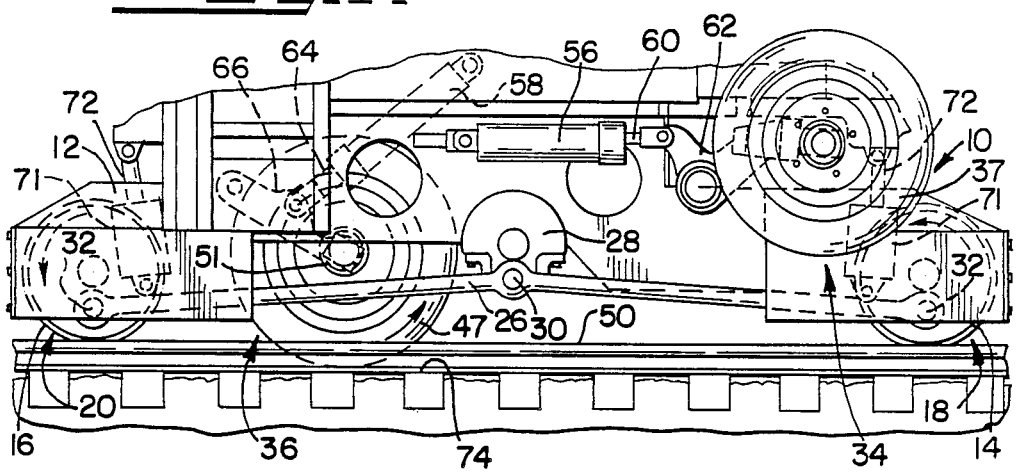
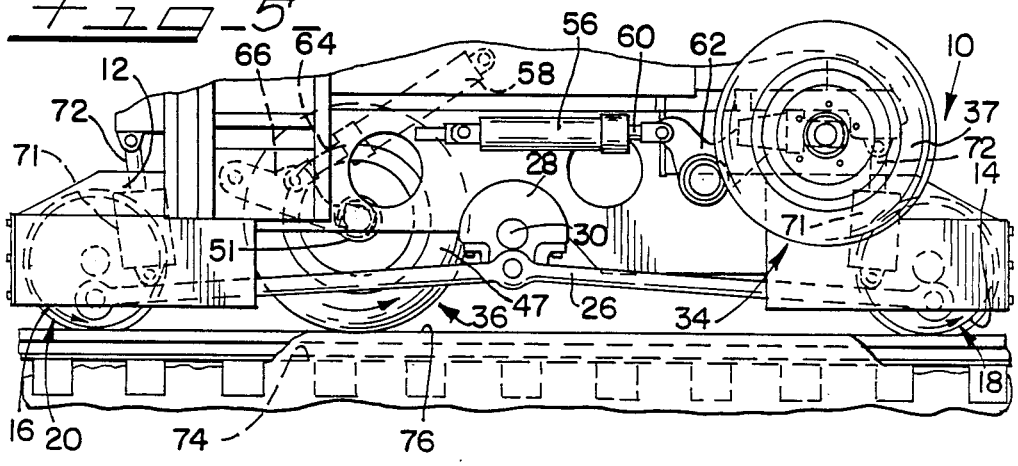
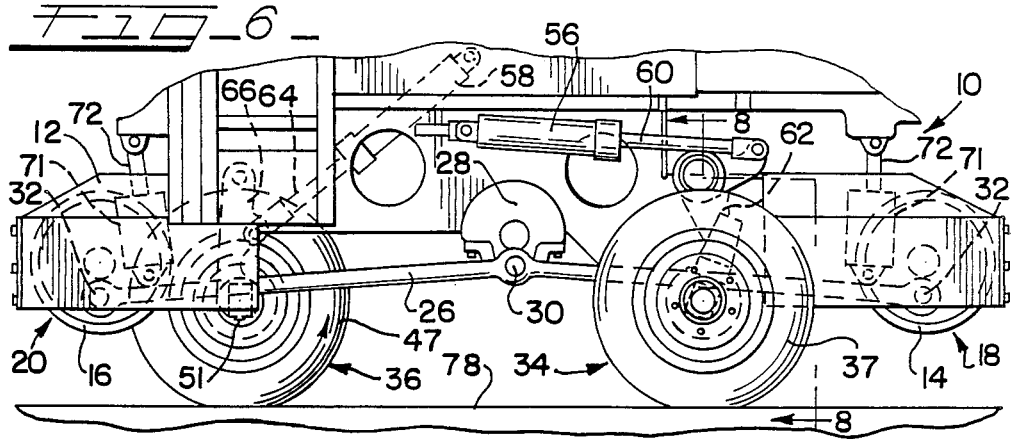

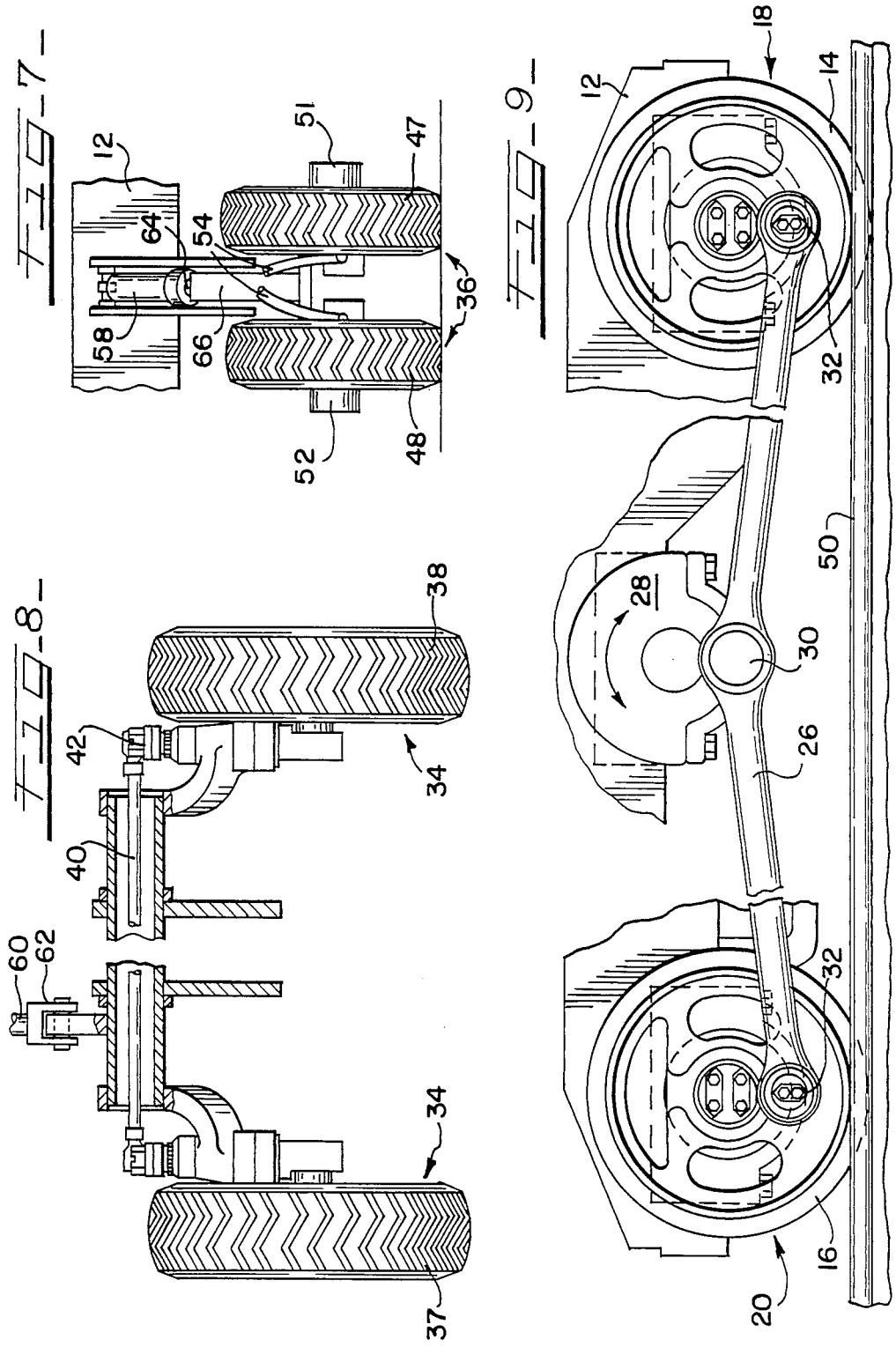

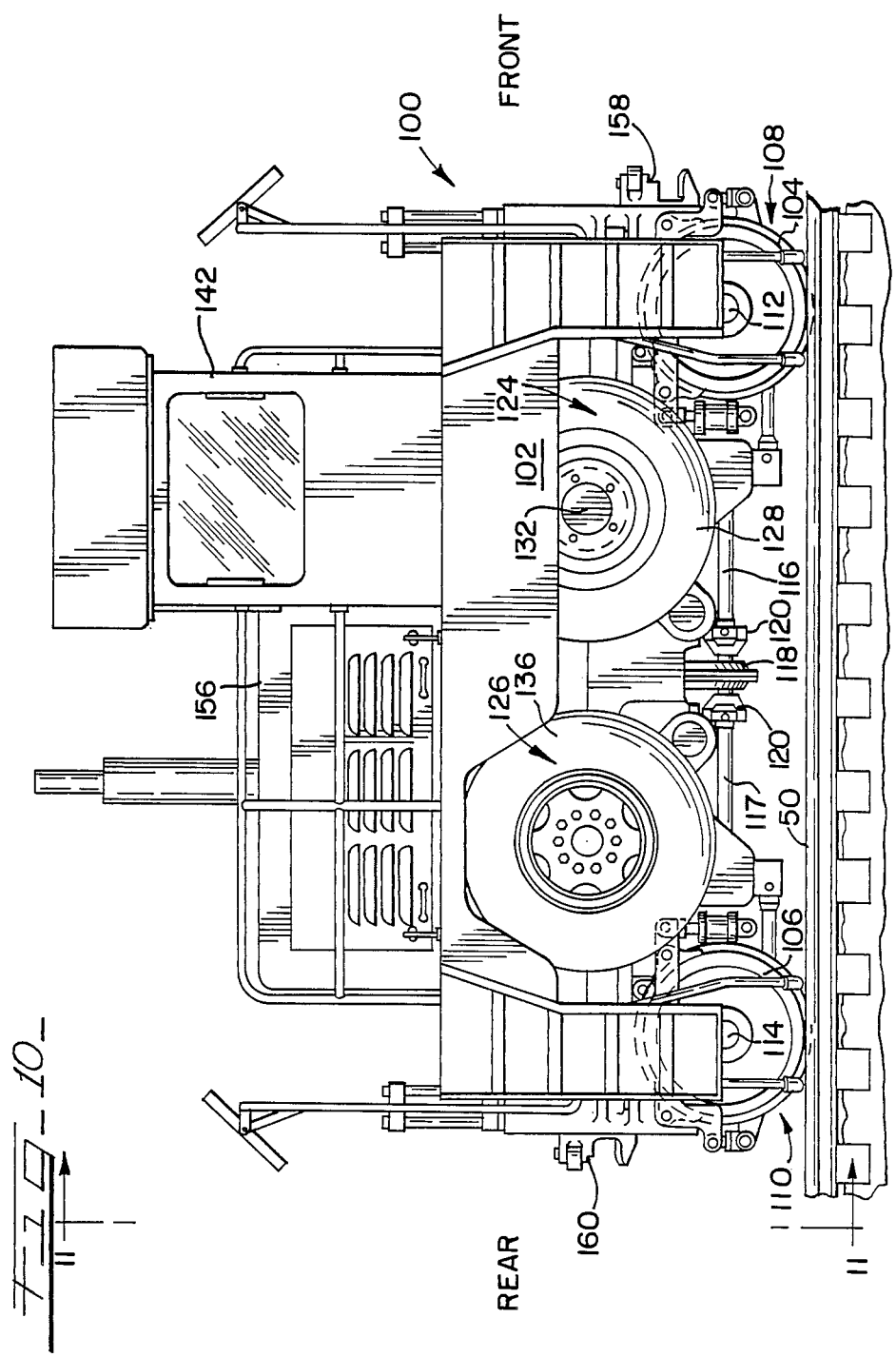

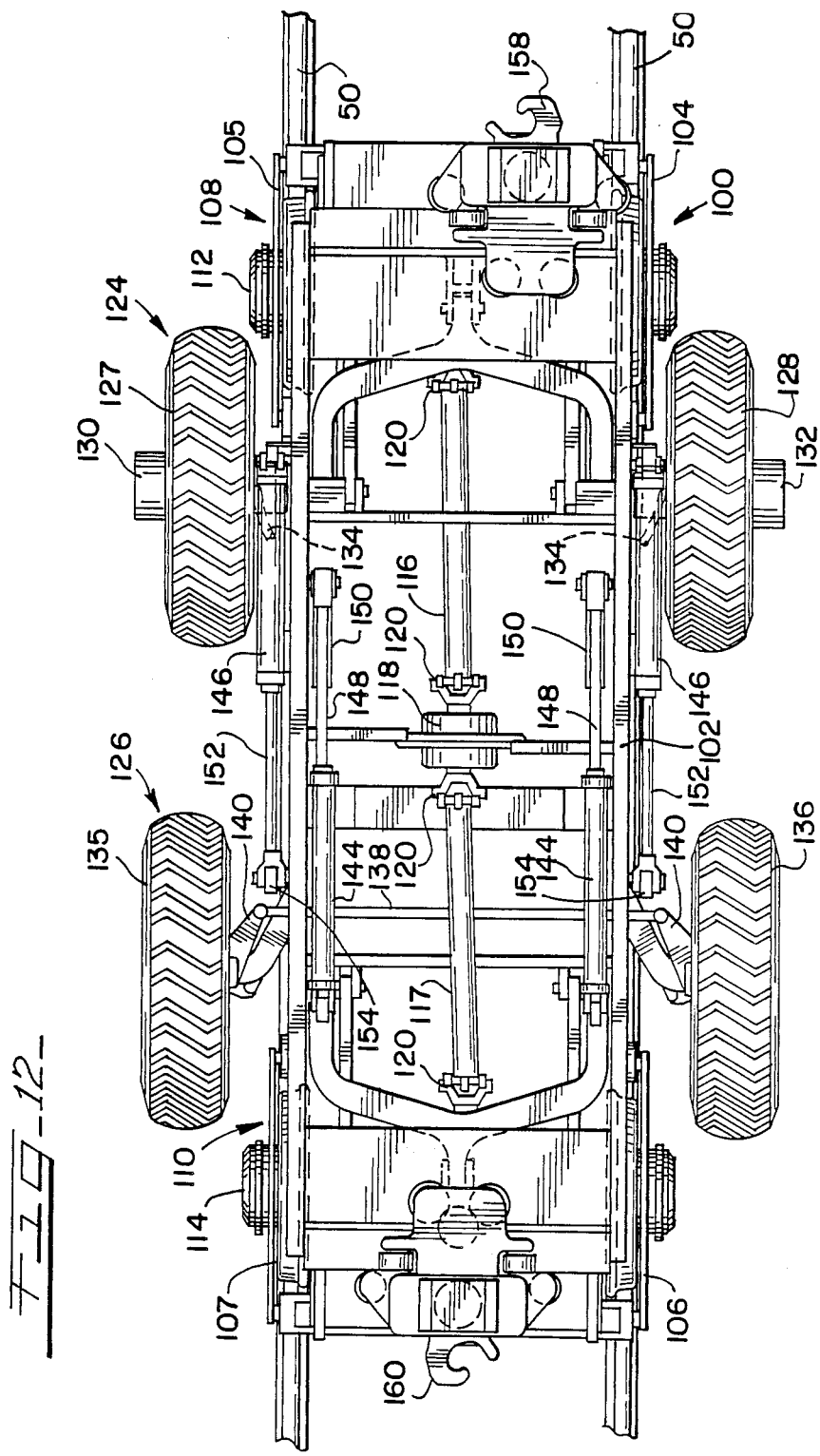

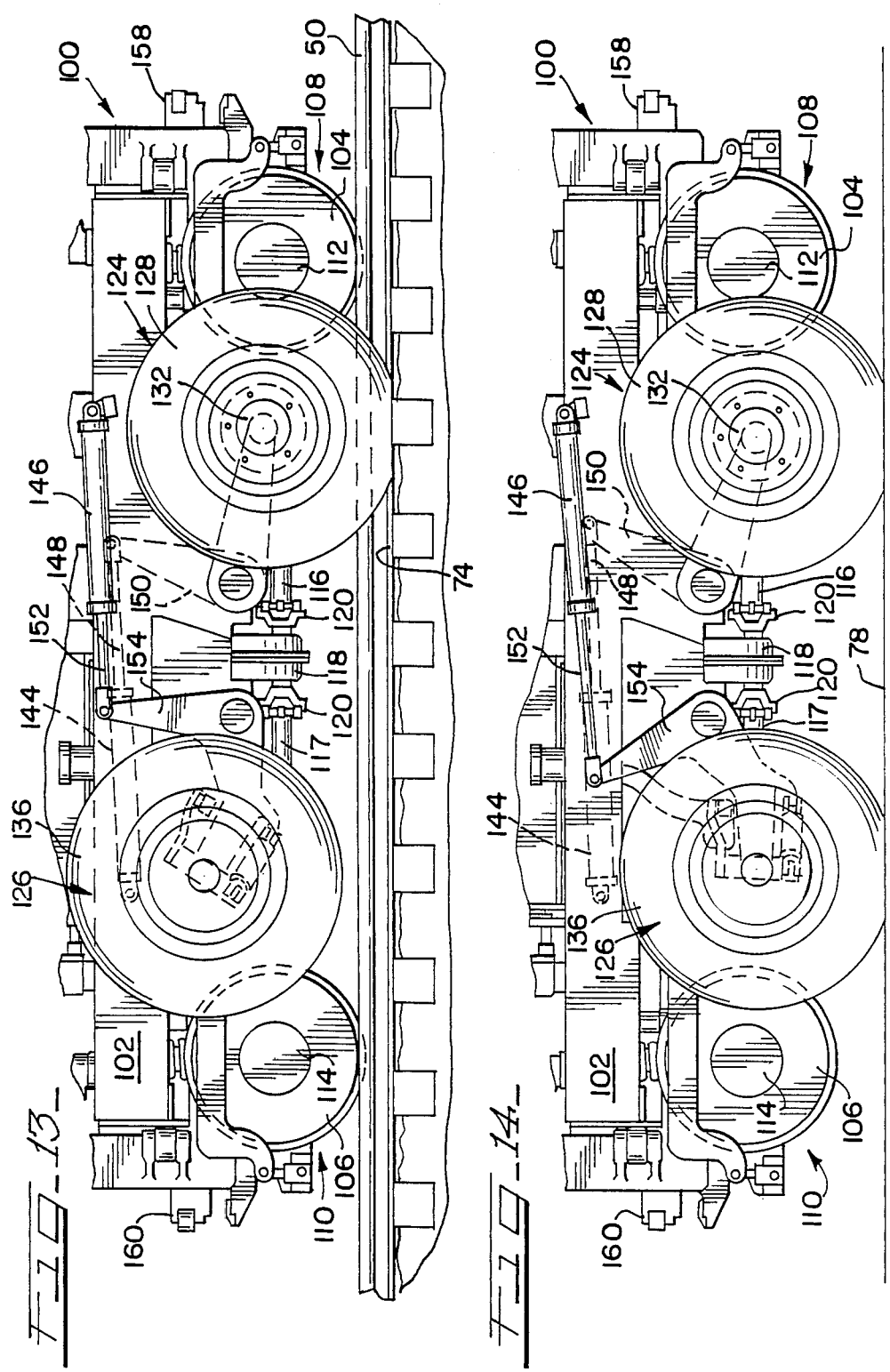

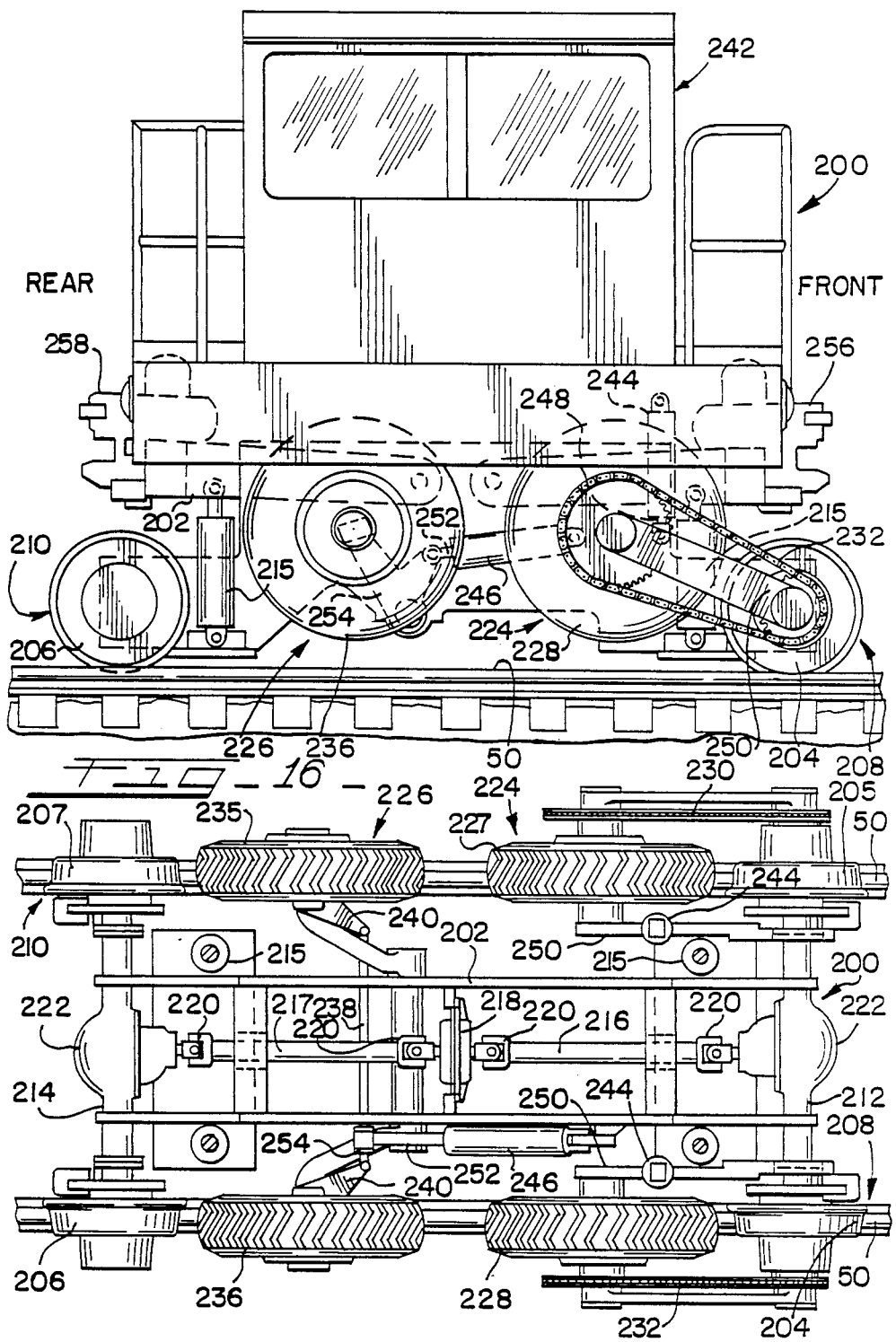

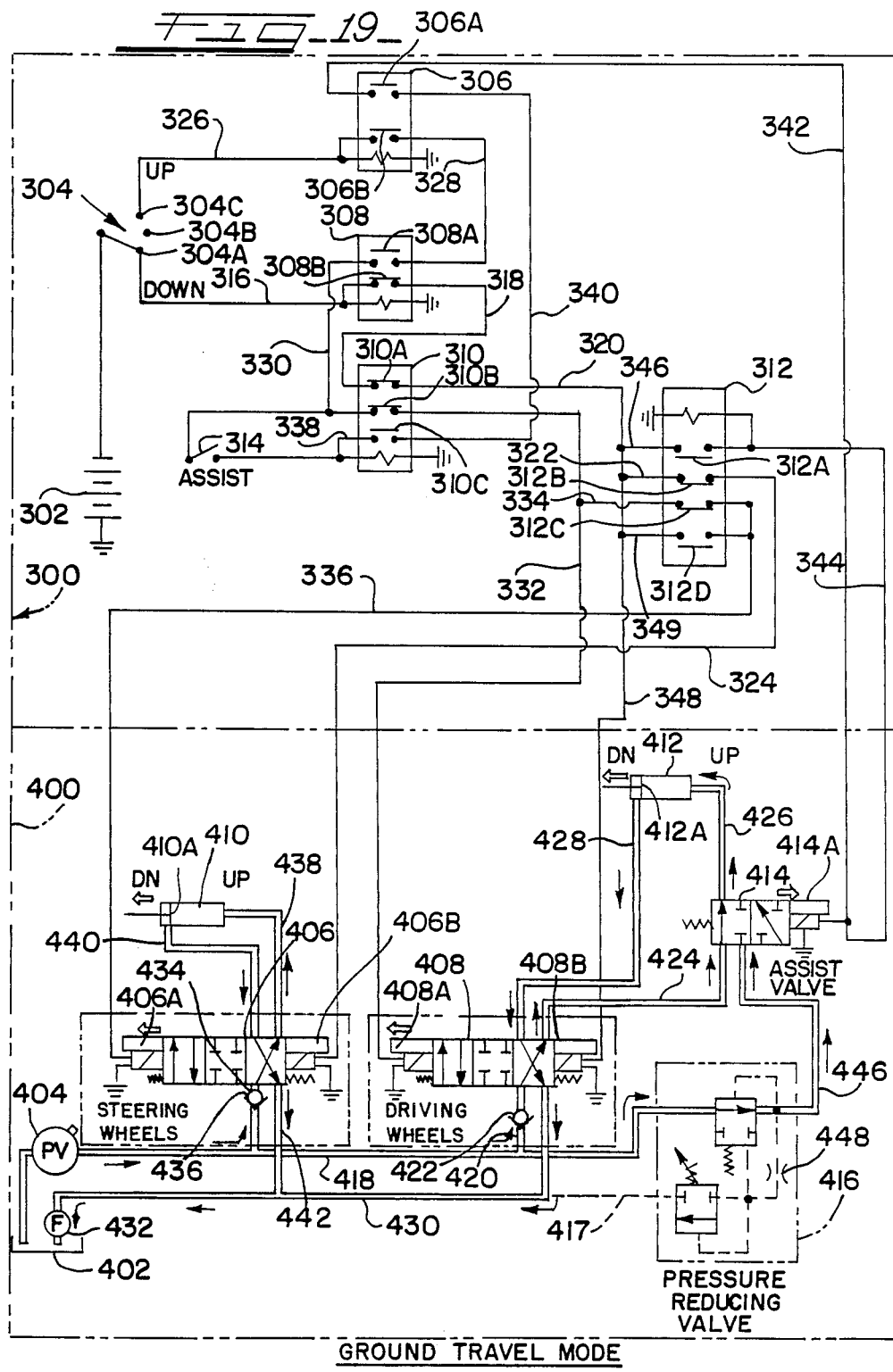

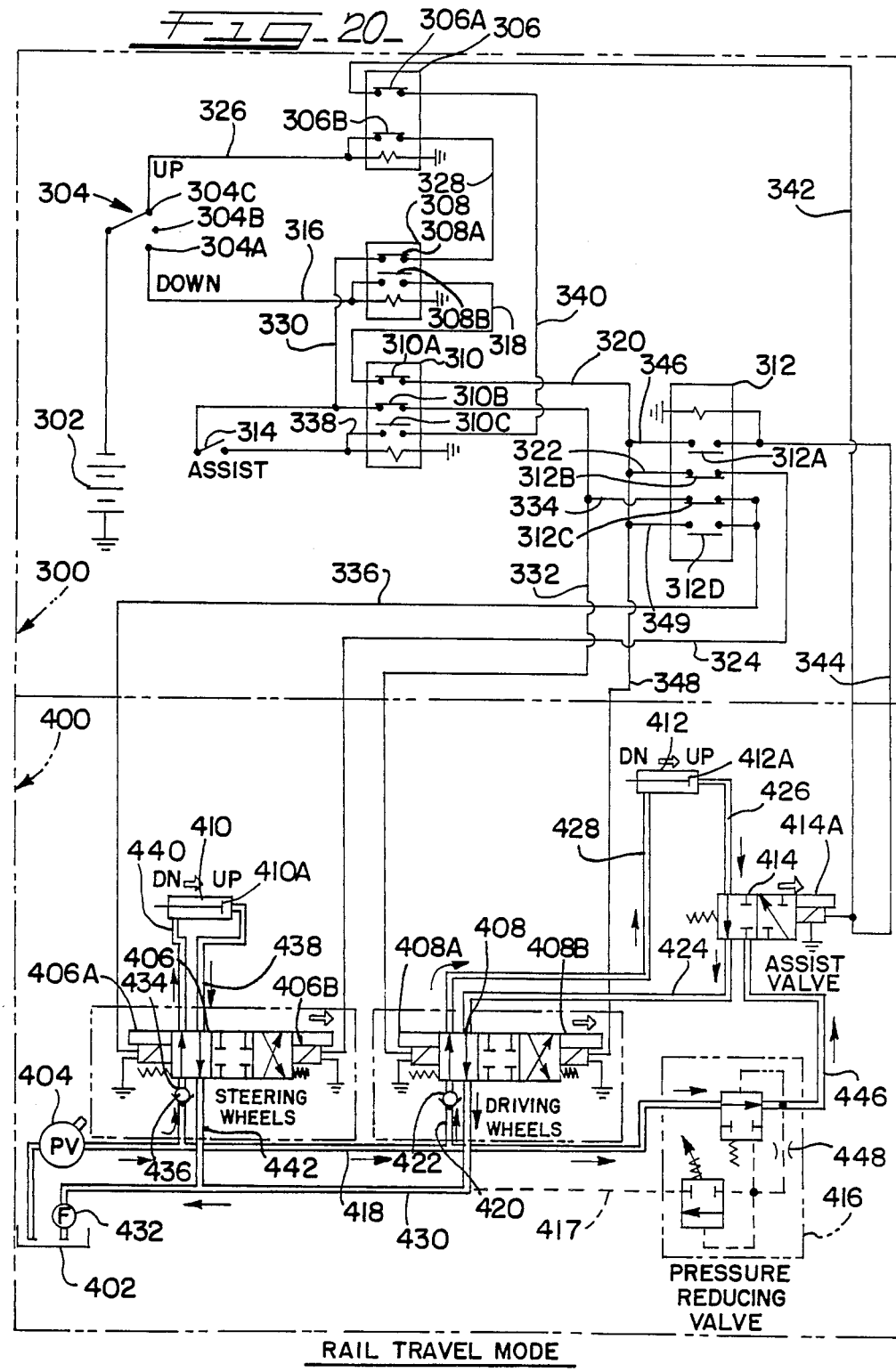

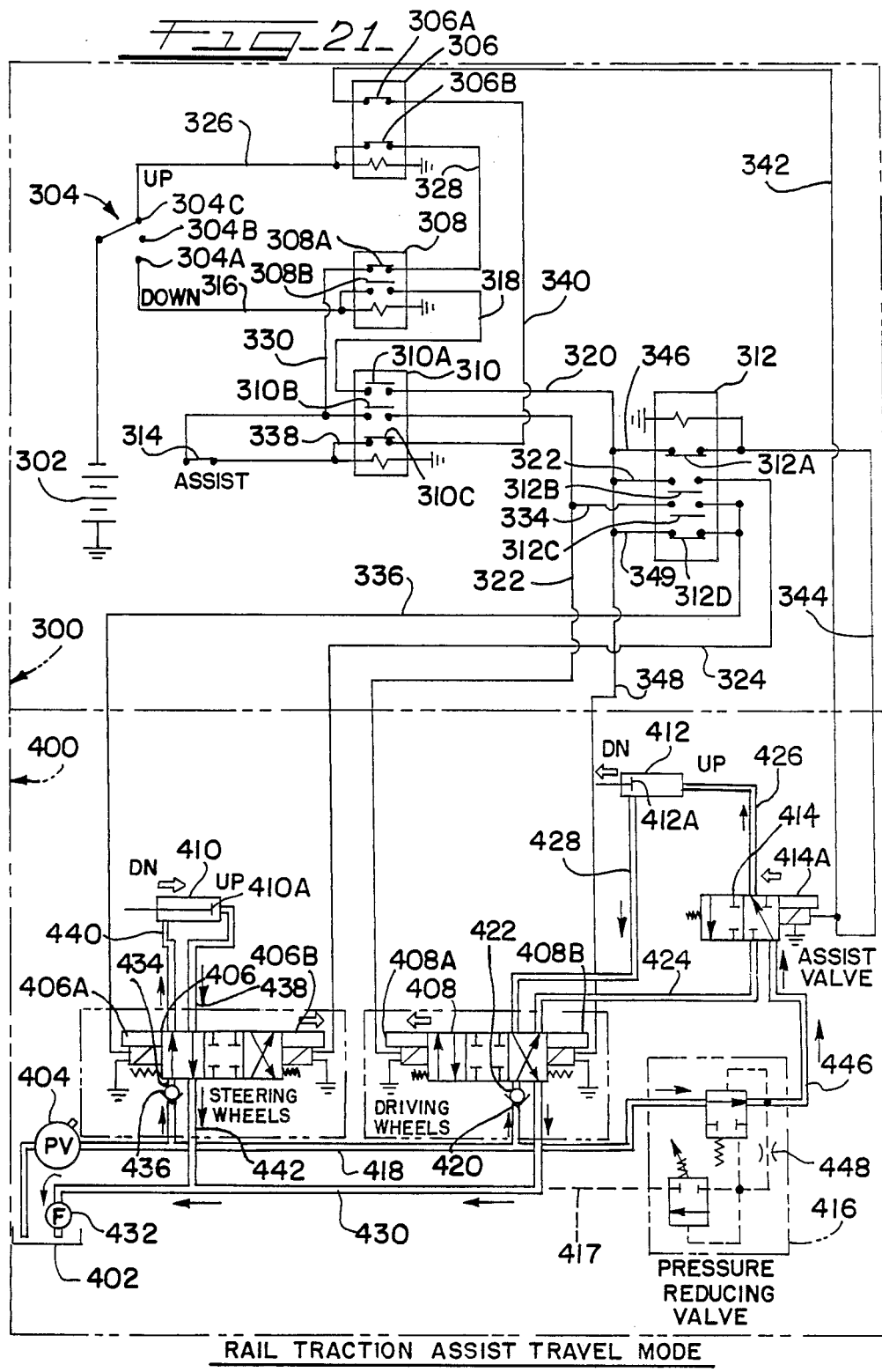

4,843,973

RAILCAR MOVING VEHICLES

This application is a continuation, of application Ser. No. 810,835, now abandoned, filed Dec. 19, 1985 which, in turn was a continuation of application Ser. No. 462,316, filed Jan. 31, 1983, now abandoned.

BACKGROUND AND SUMMARY OF THE INVENTION

The present invention relates to railcar moving vehicles of the type which are adapted for travel alternatively on railroad tracks on rail wheels or on the ground or other surface on ground wheels for moving railcars when the vehicle is on the rails.

Railcar moving vehicles of this type have been provided for moving railcars without the need for large, expensive locomotives and the like. Such vehicles are capable of operating both in a rail travel mode on the rails on which the cars are moved or in the ground travel mode for transferring the vehicle between tracks.

One such prior railcar is shown, by way of example, in U.S. Pat. No. 3,892,187. The railcar moving vehicle disclosed in that patent includes two pairs of spaced rail wheel sets which are adapted to ride upon the rails and two pairs of ground wheel sets for propelling the vehicle on the ground off of the rails. In this patent, hydraulic cylinders raise and lower the rail wheel sets such that either the rail wheel sets are in contact with the rails in the rail travel mode or the ground wheels are in contact with the ground in the ground travel mode. The ground wheels are mechanically driven by a differential and the rail wheels are driven by chains and sprockets off of the ground wheels.

In U.S. Pat. No. 4,067,259 a railcar moving vehicle is disclosed which also includes two pairs of rail wheel sets and two pairs of road wheel sets. The ground wheel sets, rather than the rail wheel sets, are moved up and down so that the vehicle is operable either in the rail travel mode in which the rail wheel sets are in contact with the rails or in the ground travel mode in which the ground wheel sets are in contact with the ground. This Letters Patent further discloss a weight transfer coupler in which a substantial portion of the weight of the railcar which is being moved is transferred and added to the weight of the railcar moving vehicle and its rail wheels to improve the traction or tractive effort of the vehicle when it is in the rail travel mode. In this railcar, the rail wheels are mechanically driven and the ground wheels are driven by driving hubs on the rail wheels which engage the ground wheel tires.

In U.S. Pat. No. 4,167,142 a railcar moving vehicle is shown which also has two pairs of rail wheel sets and two pairs of ground wheel sets. Again, the ground wheels are movable up and down such that the rail wheels are positioned on the rails in the rail travel mode and the gound wheels are positioned on the ground in the ground travel mode. As in the last previously mentioned Letters Patent, this Letters Patent also discloses a weight transfer coupler for transferring some of the weight of the railcars being moved to the vehicle rail wheels to improve the traction or tractive effort thereof.

Each of these aforementioned prior railcar moving vehicles realizes a number of advantages.

One advantage resides in the weight transfer coupler as previously mentioned. These couplers transfer a substantial portion of the weight of the railcars being moved to the railcar moving vehicle and to its rail wheels. Such weight transfer substantially increases the traction or tractive effort of the rail wheels on the rails and improves its pulling capability to the extent that relatively smaller and less expensive railcar moving vehicles have pulling capabilities which would otherwise be available only in larger switching vehicles. Another advantage of such prior railcar moving vehicles is that the railcar moving vehicles may be transferred between different tracks without the need for switches. Still another advantage of such prior railcar moving vehicles is that there is no need for the vehicle operator to leave the cab, either to accomplish coupling of the vehicle to the railcars to be moved or when transferring the vehicle itself on the ground between different sets of tracks. Still another advantage of such prior railcar moving vehicles is that the conversion from the ground travel mode to the rail travel mode or vice versa may be quickly accomplished and the vehicles are highly maneuverable when on the ground. The use of such prior railcar moving vehicles results in a substantial minimization of trackage, switches and real estate at its location of operation, and minimum work crew time and demurrage is also realized.

The present invention is directed to an improved railcar moving vehicle and control means therefor which realizes all of the aforementioned advantages of the prior railcar moving vehicles which have just been described. In addition, the railcar moving vehicle and control means therefor incorporating the principles of the present invention realizes several additional important advantages not present in such prior vehicles.

In a railcar moving vehicle and control means therefor incorporating the principles of the present invention, a substantial increase in the tractive effort or traction over the prior railcar moving vehicles in the rail travel mode is realized. Such increased tractive effort is particularly advantageous where a number of railcars are to be moved at the same time, where the railcars are heavily loaded, where traction of the rail wheels is lost, for example, if the rails are wet, or where the railcars must be moved up a grade. In a railcar moving vehicle and control means therefor incorporating the principles of the present invention, the ground wheels which are already present on the vehicle may be placed into advantageous use during the rail travel mode to realize this additional traction or tractive effort and only a minimum of additional control components need be provided to achieve this result. In several of the embodiments of railcar moving vehicle incorporating the principles of the present invention, complex ground wheel differentials for powering the ground wheels or elaborate mechanical drives from the rail wheels may be eliminated by employing individual hydrostatic units on the powered ground wheels, thus improving the operation and maneuverability of the railcar moving vehicle and simplifying its construction.

In one principal aspect of the present invention, a railcar moving vehicle is capable of travel in a first rail travel mode on flanged rail wheels on the rails of a railway track and in a second ground travel mode on ground wheels. The vehicle includes a prime mover, front and rear rail wheel sets, at least one set of which is powered by the prime mover, front and rear ground wheels aligned in the same direction as the rail wheels and drive means powering at least one of the front and rear ground wheels. Control means moves at least one of the front and rear rail wheel sets and the front and rear ground wheels relative to the other so as to interchangeably convert the vehicle from one of the travel modes to the other. The improvement in such railcar moving vehicle comprises means for moving at least one of the rail wheel sets and the ground wheels relative to each other to shift the vehicle to a third rail traction assist travel mode in which each of the rail wheel sets is in contact with the rails and the vehicle is powered by at least some of the rail wheel sets, and the powered ground wheels also simultaneously drivingly frictionally engage a surface with sufficient force to increase the traction of the vehicle.

In another principal aspect of the present invention, in the aforementioned railcar moving vehicle, the ground wheels are moved relative to the rail wheels to drivingly frictionally engage the surface to increase the traction of the vehicle when the vehicle is in the third rail traction assist travel mode.

In still another principal aspect of the present invention, in the aforementioned railcar moving vehicles, the ground wheels which drivingly frictionally engage the surface comprise a pair of ground wheels spaced from each other in a direction perpendicular to the direction of movement of the vehicle and said drive means power both of the pair of last mentioned ground wheels independently of each other and of the rail wheel sets by independent hydrostatic means.

In still another principal aspect of the present invention, in all but the last mentioned railcar moving vehicle, the ground wheels which frictionally engage the surface comprise a pair of ground wheels spaced from each other in a direction perpendicular to the direction of movement of the vehicle and both of the pair of last mentioned ground wheels are powered from at least one of the rail wheel sets by said drive means.

In still another principal aspect of the present invention, the surface which is frictionally engaged by the ground wheels in the rail traction assist travel mode of the aforementioned railcar moving vehicles may be either the bed of the railway track or the surfaces of the rails themselves.

In still another principal aspect of the present invention, the aforementioned railcar moving vehicles may include yielding means for permitting the ground wheels which drivingly frictionally engage the surface to elevate at obstacles on the surface, but to remain in frictional driving contact with such obstacles.

In still another principal aspect of the present invention, the aforementioned railcar moving vehicles include coupler means on the vehicle adjustably supporting and transferring weight from a railcar coupled to the vehicle to at least one of the rail wheel sets in the third rail traction assist travel mode.

In still another principal aspect of the present invention, control means are provided for controlling the wheel position of a railcar moving vehicle for travel in a first rail travel mode on the rails of a railway track on front and rear flanged rail wheel sets at least some of which are powered and in a second ground travel mode on front and rear ground wheels at least one of which is also powered. The control means moves at least one of the front and rear flanged rail wheel sets and front and rear ground wheels relative to the other so as to interchangeably convert the vehicle from one of the travel modes to the other. The improvement in such control means comprises means for moving at least one of the rail wheel sets and ground wheels relative to each other to shift the vehicle to a third rail traction assist travel mode in which each of the rail wheel sets is in contact with the rails and the vehicle is powered by at least some of the rail wheel sets, and powered ones of the ground wheels also simultaneously drivingly frictionally engage a surface with sufficient force to increase the traction of the vehicle.

In still another principal aspect of the present invention, the ground wheels are moved relative to the rail wheel sets to drivingly frictionally engage the surface for increasing the traction of the vehicle when the vehicle is in the third rail traction assist travel mode.

In still another principal aspect of the present invention, the aforementioned control means includes force reducing means for reducing the force with which the powered ones of the ground wheels drivingly frictionally engage the surface from the force which is exerted by the ground wheels upon the ground when the vehicle is in the ground travel mode.

In still another principal aspect of the present invention, the aforementioned control means also includes yielding means for permitting the ground wheels which drivingly frictionally engage the surface to elevate at obstacles on the surface, but to remain in frictional driving contact with the obstacles.

In still another principal aspect of the present invention, a railcar moving vehicle is capable of travel in a first rail travel mode on flanged rail wheels on the rails of a railway track and in a second ground travel mode on ground wheels. The vehicle includes a prime mover, front and rear rail wheel sets, at least one of which is powered by the prime mover, and front and rear ground wheels at least one of which is also powered. Control means moves at least one of the front and rear rail wheel sets and the front and rear ground wheels relative to the other so as to interchangeably convert the vehicle from one of the travel modes to the other. The improvement in such railcar moving vehicle comprises drive means on the powered ground wheels to power at least a pair of the ground wheels independently of each other and of the rail wheel sets.

In still another principal aspect of the present invention, in the last mentioned railcar moving vehicle the drive means whic powers the pair of ground wheels are independent hydrostatic means.

In still another principal aspect of the present invention, a vehicle for travel on flanged rail wheels on the rails of a railway track includes a prime mover and front and rear rail wheel sets at least one of which is powered by the prime mover. The improvement in such vehicle comprises at least one wheel in addition to the rail wheel sets and drive means for powering the additional wheel. Control means moves at least one of the rail wheel sets and the additional wheel relative to each other to shift the vehicle to a rail traction assist travel mode in which each of the rail wheel sets is in contact with the rails and the vehicle is powered by at least some of the rail wheel sets, and the powered additional wheel also simultaneously drivingly frictionally engages a surface with sufficient force to increase the traction of the vehicle.

In still another principal aspect of the present invention, the aforementioned additional wheel is moved relative to the rail wheels to frictionally engage the surface for drivingly increasing the traction of the vehicle when the vehicle is in the rail traction assist travel mode.

In still another principal aspect of the present invention, in the aforementioned vehicles the additional wheel which drivingly frictionally engages the surface comprises a pair of additional wheels spaced from each other in a direction perpendicular to the direction of movement of the vehicle and the drive means powers both of the last mentioned additional wheels independently of each other and of the rail wheel sets.

In still another principal aspect of the present invention, the surface which is frictionally engaged by the additional wheel or wheels in the rail traction assist travel mode of the aforementioned vehicles may be either the bed of the railway track or the surfaces of the rails themselves.

In still another principal aspect of the present invention, the aforementioned vehicles may include yielding means for permitting the additional wheel or wheels which drivingly frictionally engage the surface to elevate at obstacles on the surface, but remain in frictional driving contact with such obstacles.

In still another principal aspect of the present invention, the aforementioned vehicles include coupler means on the vehicle adjustably supporting and transferring weight from a railcar ooupled to the vehicle to at least one of the rail wheel sets in the rail traction assist travel mode.

These and other objects, features and advantages of the present invention will become more readily understood upon a consideration of the following detailed description.

BRIEF DESCRIPTION OF THE DRAWINGS

In the course of this description, the drawings will be frequently referred to in which:

FIG. 1 is a side elevational view of a first preferred embodiment of railcar moving vehicle incorporating the principles of the present invention in which such vehicle is shown in the rail travel mode;

FIG. 2 is an end elevational view of the first embodiment of vehicle still in the rail travel mode, as viewed substantially along line 2—2 of FIG. 1;

FIG. 3 is a top plan view of the first embodiment of railcar moving vehicle, as viewed substantially along line 3—3 of FIG. 1;

FIG. 4 is a reduced, broken side elevational view of the first embodiment of railcar moving vehicle similar to the view shown in FIG. 1, but in which the vehicle is in the rail traction assist travel mode according to the principles of the present invention;

FIG. 5 is a reduced, broken side elevational view of the first embodiment of railcar moving vehicle similar to the view shown in FIG. 4 and still in the rail traction assist travel mode, but in which the ground wheels have yielded to an obstacle;

FIG. 6 is a reduced, broken side elevational view of the first embodiment of railcar moving vehicle similar to the views shown in FIGS. 1, 4 and 5, but in which the vehicle is in the ground travel mode;

FIG. 7 is a broken, end elevational view of the rear powered ground wheels of the first embodiment of railcar moving vehicle, as substantially viewed from the left in FIG. 6;

FIG. 8 is a cross-sectioned, partially broken, end elevational view of the front steering wheels of the first embodiment of railcar moving vehicle as viewed from the right and substantially along line 8—8 in FIG. 6;

FIG. 9 is a broken, side elevational view of the rail wheels and their drive assembly of the first embodiment of railcar moving vehicle of the present invention;

FIG. 10 is a side elevational view of a second preferred embodiment of railcar moving vehicle incorporating the principles of the present invention in which the vehicle is shown in the rail travel mode;

FIG. 12 is a top plan view of the second embodiment of railcar moving vehicle in which the superstructure of the vehicle has been removed to show the ground and rail wheel configuration and drive of the vehicle;

FIG. 13 is a broken, side elevational view of the second embodiment of railcar moving vehicle similar to the view shown in FIG. 10, but in which the vehicle is in the rail traction assist travel mode;

FIG. 14 is a broken, side elevational view of the second embodiment of railcar moving vehicle similar to the views shown in FIGS. 10 and 13, but in which the vehicle is in the ground travel mode of operation;

FIG. 15 is a side elevational view of a third preferred embodiment of railcar moving vehicle incorporating the principles of the present invention and in which the vehicle is shown in the rail travel mode of operation;

FIG. 16 is a top plan view of the third embodiment of railcar moving vehicle in which the superstructure of the vehicle has been removed to show the ground and rail wheel configuration and drive of the vehicle;

FIG. 19 is an electrical and hydraulic schematic diagram showing of a preferred embodiment of control means for the aforementioned vehicle embodiments in which the electrical and hydraulic control circuits are shown in the ground travel mode;

FIG. 20 is the electrical and hydraulic schematic diagram shown in FIG. 19, but in the rail travel mode; and FIG. 21 is the electrical and hydraulic schematic diagram shown in FIG. 19, but in the rail traction assist travel mode.

DESCRIPTION OF THE PREFERRED EMBODIMENTS

Figure 11:
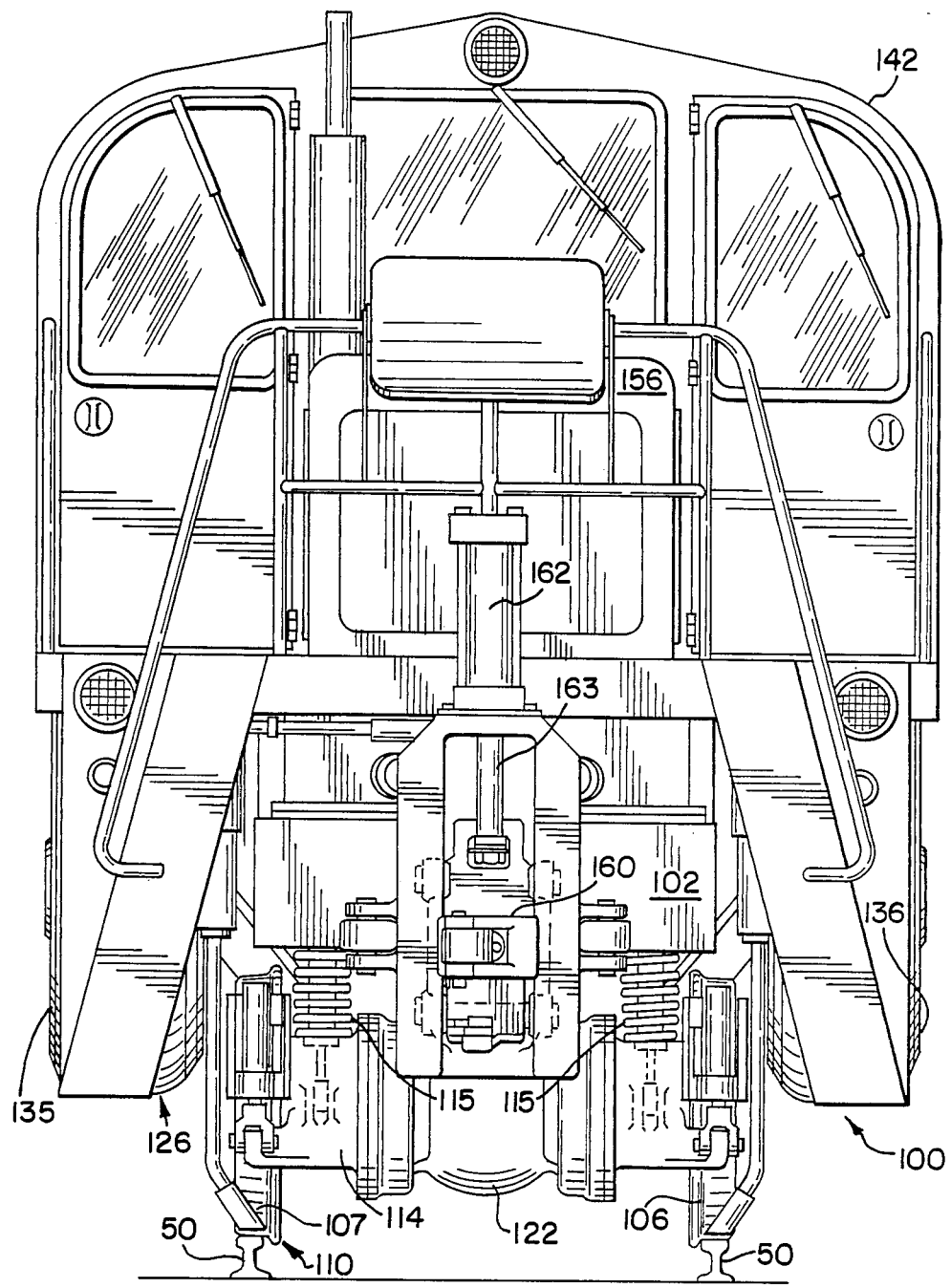
FIG. 11 is an end elevational view of the second embodiment of railcar moving vehicle still in the rail travel mode, as viewed substantially along line 11—11 of FIG. 10.

In general, hhree preferred embodiments of railcar moving vehicle incorporating the principles of the present invention and three modes of travel of each embodiment are shown in the drawings.

The first embodiment of railcar moving vehicle 10 is shown in FIGS. 1-9. This first embodiment is shown in its rail travel mode in FIG. 1, in its rail traction assist travel mode in FIGS. 4 and 5, and in its ground travel mode in FIG. 6.

The second embodiment of railcar moving vehicle 100 is shown in FIGS. 10-14. This second embodiment is shown in its rail travel mode in FIG. 10, in its rail traction assist travel mode in FIG. 13, and in its ground travel mode in FIG. 14.

The third embodiment of railcar moving vehicle 200 is shown in FIGS. 15-18. This third embodiment is shown in its rail travel mode in FIG. 15, in its rail traction assist travel mode in FIG. 17, and in its ground travel mode in FIG. 18.

First Embodiment of Railcar Moving Vehicle

As shown in FIGS. 1-6 in particular, the first embodiment of railcar moving vehicle 10 incorporating the principles of the present invention includes a frame 12 to which the rail wheels 14, 15, 16 and 17 are mounted for operation when the vehicle is in the rail travel mode as will be explained in more detail hereinafter. Each of the flanged rail wheels 14-17 are arranged in two sets, rail wheels 14 and 15 comprising a front rail wheel set 18 and rail wheels 16 and 17 comprising a rear rail wheel set 20, as best shown in FIGS. 3-6 and 9. The flanged rail wheels 14-17 are rotatably mounted on opposite ends of an axle 22, in the case of the front rail wheel set 18, and axle 24, in the case of the rear rail wheel set 20, as shown in FIG. 3.

Each of the rail wheel sets 18 and 20 is driven from opposite sides of the vehicle by side rods 26 as shown in FIGS. 1, 4-6 and 9. The side rods 26 are driven in a known manner by drive cranks 28 which are mounted on opposite ends of a main drive axle (not shown). The drive cranks 28 include an eccentric crank pin 30 projecting therefrom so that a driving force will continuously be applied by one or the other of the drive cranks to the side rods 26 on one side or the other of the vehicle. The power is transmitted from the respective drive cranks through the side rods 26 to an eccentrically mounted journal pin 32 on each of the rail wheels 14-17, as best shown in FIGS. 1, 4-6 and 9, to drive the respective rail wheels when the vehicle is in the rail travel mode.

The vehicle 10 also includes a front ground wheel set 34 and a rear ground wheel set 36.

The front ground wheel set 34 preferably comprises a pair of pneumatic rubber tires 37 and 38, as best shown in FIG. 3. The front ground wheel set 34 preferably constitutes the steering wheels of the vehicle. As such they are coupled together by a tie rod 40, as best shown in FIG. 8, which is linked to each of the ground wheels by a suitable steering linkage 42. The tie rod 40 is coupled, via a suitable steering mechanism (not shown), to the vehicle steering wheel (not shown) in the cab 46 of the vehicle 10.

The rear ground wheel set 36 also preferably comprises a pair of pneumatic rubber tires 47 and 48 which are also spaced laterally from each other, as best shown in FIGS. 3 and 7, in a direction perpendicular to the direction of movement of the vehicle on the track rails 50. Each of these tires 47 and 48 is preferably powered or driven by independent hydrostatic motors 51 and 52 which are coupled by individual conduits 54, as best shown in FIG. 7, to a suitable source of hydraulic power. Each of the hydrostatic motors 51 and 52 is preferably independently driven such that operation of each of the ground wheel tires 47 and 48 is independent of each other and also of the rail wheel sets 18 and 20.

Hydraulic cylinders 56 and 58 are provided for raising and lowering the front ground wheel set 34 and rear ground wheel set 36, respectively, as best shown in FIGS. 4-6. One end of the cylinder 56 is pivotally mounted to the frame 12 and the cylinder 56 is coupled, via piston rod 60 and crank arm 62, to the front ground wheel set 34, as shown in FIGS. 1, 4-6 and 8. One end of the cylinder 58 is pivotally mounted to the frame 12 and the cylinder 58 is coupled, via piston rod 64 and crank arm 66, to the rear ground wheel set 36 for raising and lowering that ground wheel set.

The vehicle 10 is powered by a suitable prime mover, such as a motor or engine 68, as shown in FIGS. 1 and 2. The engine 68 not only provides the power for propelling and driving the rail wheel sets 18 and 20 via drive crank 28, but also provides power for the hydraulic system, as well as for the electrical system. The power train to the rail wheels will not be described to an extent further than it has already been described because the details of such drive train does not form an important part of the present invention. A suitable power train, including transmission, is disclosed in the aforementioned U.S. Pat. No. 4,167,142, and the disclosure of that patent is incorporated herein by reference.

Railcar couplers 69 and 70 are also carried upon the frame 12 of the vehicle 10 at each end of the vehicle, as best shown in FIGS. 1-3. These coupler mountings 69 and 70 are of the jacking type and each includes a hydraulic cylinder 71 and piston rod 72 for raising and lowering the couplers and the railcar (not shown) which is coupled thereto. As the railcar is raised when the vehicle is in the rail tavel mode, a substantial portion of the weight of the railcar is transferred to the vehicle 10 and its rail wheels 14-17 which results in an increase in the effective weight of the vehicle and its tractive effort on the rails. The construction and operation of the couplers 69 and 70 will not be described further in detail herein. A suitable coupler assembly is fully disclosed in the aforementioned U.S. Pat. No. 4,167,142, the disclosure of which is incorporated herein by reference.

Description of the Mechanical Operation of the First Embodiment

The vehicle 10 is shown in FIG. 1 in its rail travel mode. In this mode, hydraulic fluid is ported to both cylinders 56 and 58 so as to retract the pistons in the cylinders and their rods 60 and 64 fully into the cylinders to elevate both the front ground wheel set 34 and rear ground wheel set 36. When these ground wheel sets have been elevated, the vehicle 10, which has previously been positioned with its rail wheels 14-17 in overlying alignment with the track rails 50, will come to rest upon the track rails, as shown in FIG. 1.

The vehicle 10 may now be propelled in the rail travel mode along the track rails 50 until one of its couplers 69 or 70 is positioned adjacent a railcar (not shown) which is to be moved. The coupling is made with the railcar and the appropriate coupler 69 or 70 is elevated, via its cylinder 71 and piston rod 72, so as to lift or jack the coupled end of the railcar so that a substantial portion of the weight of the railcar is now supported upon the vehicle 10. The vehicle 10 is then moved along the rail 50 on the rail wheel sets 18 and 20 until the railcar which is being moved has been located in its desired position.

If difficulty is encountered in moving the railcar due to insufficient tractive effort of the rail wheels 14-17 alone, the vehicle 10 may be shifted to the rail traction assist travel mode, as shown in FIGS. 4 and 5. Insufficiency of tractive effort in the rail travel mode may be due to any one of several reasons. For example, the track rails 50 may be wet, the number of railcars being moved is substantial, the cargo in the railcar or cars being moved is of substantial weight, or an upgrade may be encountered.

In any event, if additional tractive effort is found to be desirable, hydraulic fluid, under less than full hydraulic pressure as will be described in more detail to follow, is admitted to cylinder 58 to cause the piston in this cylinder to move downwardly and extend the piston rod 64 so as to rotate the rear powered ground wheel set 36 downwardly, via crank arm 66, until the rear ground wheel set tires 47 and 48 are in contact with the surface of the track rail bed 74 between the track rails 50, as shown in FIG. 4. The force exerted by the cylinder 58 is less than would normally be exerted to lift the rail wheel sets 18 and 20 from the rails, as occurs in the ground travel mode yet to be described. However, the force exerted by the ground wheel set 36 is sufficient to exert a substantial force against the surface of the track rail bed so that the tires 47 and 48 will frictionally engage the track rail bed 74, as shown in FIG. 4.

Hydraulic power may now be transmitted to one and preferably both of the hydrostatic motors 51 and 52 of the rear ground wheel set 36 to drive these wheels and assist in the tractive effort which is necessary to propel the vehicle 10 and to move the vehicle with its railcar or cars on the rails.

When this additional tractive effort is no longer necessary, e.g. when the upgrade has been surmounted, the vehicle 10 may again be returned to its rail travel mode by retracting the piston in cylinder 58, thus retracting the rear ground wheel set 36 to the upper position shown in FIG. 1.

If an obstacle is encountered by the rear ground wheel set 36 during movement of the vehicle 10 in the rail traction assist travel mode, the rear wheel set will automatically yield and elevate and follow the surface of the obstacle continuing to provide tractive effort while riding over the obstacle, as shown in FIG. 5. Such obstacle may consist of any one of a number of obstacles, such as another cross rail or a cross roadway 76, as shown in FIG. 5. Such automatic following of the terrain by the rear wheel set 36 is possible due to the reduced pressure in the cylinder 58 and the action of the pressure reducing valve as shown in FIG. 21 and as will be described in detail to follow. The force which is maintained upon the tires 47 and 48 is sufficient only to obtain the additional tractive effort desired. By way of example, this force may be on the order of approximately 5,000 pounds on each tire 47 and 48.

Once the railcar which is being moved has been located at its desired location, the coupler 69 or 70 which supports the railcar is lowered until the weight of the railcar is again fully supported upon the track rails 50 and not upon the vehicle. The vehicle 10 is then moved away from the railcar.

If it is desired to position the vehicle 10 on another set of track rails for movement of a new railcar on those tracks, the vehicle may be shifted to its ground travel mode, as is shown in FIG. 6.

In this ground travel mode, full hydraulic pressure is applied to both cylinders 56 and 58 to fully extend the piston rods 60 and 64, respectively, from the cylinders causing the crank arms 62 and 66 to rotate the front ground wheel set 34 and rear ground wheel set 36, respectively, into their full downward positions, as shown in FIG. 6. In these positions, the vehicle 10 is supported entirely upon the ground wheel sets 34 and 36 and the rail wheel sets 18 and 20 are elevated as shown. Once the vehicle 10 is fully supported upon the ground wheel sets, the rear ground wheel set 36 may be powered by the hydrostatic motors 51 and 52 to propel the vehicle to its new location on a conventional roadway or the like 78, as shown in FIG. 6, and the vehicle is maneuvered to the new track by steering the front ground wheel set 34 as necessary.

Once the vehicle 10 has been positioned on the new track rails on which the vehicle is to now be operated, the vehicle is again shifted to its rail travel mode, as shown in FIG. 1, and as previously described.

Second Embodiment of Railcar Moving Vehicle

As shown in FIGS. 10-14 in particular, the second embodiment of railcar moving vehicle 100 incorporating the principles of the present invention includes a frame 102 to which rail wheels 104, 105, 106 and 107 are mounted for operation when the vehicle is in the rail travel mode as will be explained in more detail hereinafter. Each of the flanged rail wheels 104-107 are arranged in two sets, rail wheels 104 and 105 comprising a front rail wheel set 108 and rail wheels 106 and 107 comprising a rear rail wheel set 110. The flanged rail wheels 104-107 are rotatably mounted on opposite ends of an axle 112, in the case of the front rail wheel set 108, and axle 114, in the case of the rear rail wheel set 110, and the axles may be mounted by springs 115 to the frame 102 of the vehicle, as shown in FIG. 11.

Each of the rail wheel sets 108 and 110 is driven via drive shafts 116 and 117, respectively. A power output connection (not shown) from a transmission (not shown) is coupled to a drop box 118 and suitable universal joints 120 couple the drive shafts 116 and 117 to the drop box 118 at one end and to differentials on each axle 112 and 114, such as differential 122 on axle 114, as shown in FIG. 11, to drive the rail wheel sets 108 and 110 when the vehicle is in the rail travel mode.

The vehicle 100 also includes a front ground wheel set 124 and a rear ground wheel set 126.

The front ground wheel set 124 preferably comprises a pair of pneumatic rubber tires 127 and 128, as best shown in FIG. 12. The front ground wheel set 124 preferably constitutes the powered or driving wheels in this embodiment. Each of these tires or ground wheels 127 and 128 is preferably powered, as previously described, by independent hydrostatic motors 130 and 132 which are coupled by individual conduits 134, as best shown in FIG. 12, to a suitable source of hydraulic power (not shown). Each of the hydrostatic motors 130 and 132 is preferably independently driven such that operation of each of the ground wheel tires 127 and 128 is independent of the other and also of the rail wheel sets 108 and 110.

The rear ground wheel set 126 also preferably comprises a pair of pneumatic rubber tires 135 and 136, as best shown in FIG. 12. The rear ground wheel set 126 preferably constitutes the steering wheels of the vehicle which is the converse of the arrangement previously described for the first embodiment. As such, these wheels or tires 135 and 136 are coupled together by a tie rod 138, as best shown in FIG. 12, which is linked to each of the ground wheels by a suitable steering linkage 140. The tie rod 138 is coupled, via a suitable steering mechanism (not shown), to the vehicle steering wheel (not shown) in the cab 142 of the vehicle 100.

In this second embodiment two pairs of hydraulic cylinders 144 and 146 are provided for raising and lowering the front ground wheel set 124 and rear ground wheel set 126, respectively, as best shown in FIGS. 12-14. One end of the pair of cylinders 144 is pivotally mounted to the frame 102 and the other end of the cylinders 144 are coupled, via piston rods 148 and crank arms 150, to the front ground wheel set 124, as best shown in FIGS. 12-14. One end of the pair of cylinders 146 is pivotally mounted to the frame 102 and the cylinders 146 are coupled, via piston rods 152 and crank arms 154, to the rear ground wheel set 126 for raising and lowering that ground wheel set.

The vehicle 100 is powered by a suitable prime mover, such as a motor or engine 156, as shown in FIGS. 10 and 11. The engine 156 not only provides the power for propelling and driving the rail wheel sets 108 and 110 via drop box 118, but also provides power for the hydraulic system, as well as for the electrical system. The power train to the rail wheels will not be described to an extent further than it has already been described because the details of such drive train do not form an important part of the present invention.

Railcar couplers 158 and 160 are also carried upon the frame 102 of the vehicle 100 at each end of the vehicle. These couplers 158 and 160 are again of the jacking type, and each includes a hydraulic cylinder 162 and piston rod 163, as best shown in FIG. 11, for raising and lowering the coupling and railcar (not shown) which is coupled thereto. As the railcar is raised when the vehicle is in the rail travel mode, a substantial portion of the weight of the railcar is transferred to the vehicle 100 and its rail wheels 104-107 to result in an increase in the effective weight of the vehicle and its tractive effort as previously described. The construction and operation of the couplers 158 and 160 will not be described further in detail herein. A suitable coupler assembly is fully disclosed in the aforementioned U.S. Pat. No. 4,067,259, the disclosure of which is incorporated herein by reference.

Description of the Mechanical Operation of the Second Embodiment

The vehicle 100 is shown in FIG. 10 in its rail travel mode. In this mode, hydraulic fluid is ported to both pairs of cylinders 144 and 146 so as to retract the pistons in the cylinders and their rods 148 and 152 fully into the cylinders to elevate both the front ground wheel set 124 and rear ground wheel set 126. When these ground wheel sets have been elevated, the vehicle 100, which has previously been positioned with its rail wheels 104-107 in overlying alignment with the track rails 50, will come to rest upon the rail wheels, as shown in FIG. 10.

The vehicle 100 may now be propelled in the rail travel mode along the track rail 50 until one of its couplers 158 or 160 is positioned adjacent a railcar (not shown) which is to be moved. The coupling is made with the railcar and the appropriate railcar coupling 158 or 160 is elevated, via its cylinder 162 and piston rod 163, so as to lift or jack the coupled end of the railcar so that a substantial portion of the weight of the railcar is now supported upon the vehicle 100. The vehicle 100 is then moved along the rails 50 on the rail wheel sets 108 and 110 until the railcar which is being moved has been located in its desired location.

If difficulty is encountered in moving the railcar due to insufficient tractive effort of the rail wheels 104-107 alone, the vehicle 100 may be shifted to the rail traction assist travel mode, as shown in FIG. 13. In this condition, hydraulic fluid, again under less than full hydraulic pressure as will be described in more detail to follow, is admitted to the pair of cylinders 144 to cause the pistons in the cylinders to move outwardly and extend the piston rods 148 so as to rotate the front ground wheel set 124 downwardly, via crank arms 150, until the front ground wheel set tires 127 and 128 are in contact with the surface of the track rail bed 74, as shown in FIG. 13. It will be noted that the operation in this embodiment differs somewhat from the previously described operation of the first embodiment in that it is the front ground wheel set 124, rather than the rear ground wheel set, which is lowered in the rail traction assist travel mode and when these wheels are lowered, they straddle the track rails 50 as shown in FIG. 13, rather than fall between the track rails 50. The force exerted by the cylinder 144 is less than would normally be exerted to lift rail wheel sets 108 and 110 from the rails, the latter of which occurs in the ground travel mode yet to be described. However, the force exerted by the ground wheel set 124 is sufficient to exert a substantial force against the surface of the track rail bed 74 so that the tires 127 and 128 will frictionally engage the track rail bed 74, as shown in FIG. 13.

Hydraulic power may now be transmitted to one and preferably both of the hydrostatic motors 130 and 132 of the front ground wheel set 124 to drive these wheels and assist in the tractive effort which is necessary to propel the vehicle 100 on the rails and to move the vehicle with its railcar or cars.

When this additional tractive effort is no longer necessary, the vehicle 100 may again be returned to its rail travel mode by retracting the pistons in cylinders 144, thus, retracting the front ground wheel set 124 to the upper position shown in FIG. 10.

If an obstacle is encountered by the front ground wheel set 124 during movement of the vehicle 100 in the rail traction assist travel mode, the lowered front wheel set will automatically yield and elevate and will follow the surface of the obstacle, continuing to provide tractive effort while riding over the obstacle, as previously described with respect to the first embodiment.

Once the railcar which is being moved has been located at its desired location, the coupler 158 or 160 which supports the railcar is lowered until the weight of the railcar is again fully supported upon the track rails 50 and not upon the vehicle. The vehicle 100 is then moved away from the railcar.

If it is desired to position the vehicle 100 on another set of track rails for movement of a new railcar on those tracks, the vehicle may be shifted to its ground travel mode, as shown in FIG. 14.

In this ground travel mode, full hydraulic pressure is applied to both pairs of cylinders 144 and 146 to fully extend their piston rods 148 and 152, respectively, from the cylinders causing the crank arms 150 and 154 to rotate both the front ground wheel set 124 and rear ground wheel set 126, respectively, to their full downward positions, as shown in FIG. 14. In these positions, the vehicle 100 is supported entirely upon the ground wheel sets 124 and 126 and the rail wheel sets 108 and 110 are elevated as shown. Once the vehicle 100 is fully supported upon the ground wheel sets, the front ground wheel set 124 may be powered by the hydrostatic motors 130 and 132 to propel the vehicle n a conventional roadway or the like 78, as shown in FIG. 14, to its new location. The vehicle is maneuvered to the new track by steering the rear ground wheel set 126 as necessary.

Once the vehicle 100 has been positioned on the new track rails on which the vehicle is to now be operated, the vehicle is again shifted to its rail travel mode, as shown in FIG. 10, and as previously described.

Third Embodiment of Railcar Moving Vehicle

As shown in FIGS. 15–18 in particular, the third embodiment of railcar moving vehicle 200 incorporating the principles of the pesent invention includes a frame 202 to which the rail wheels 204, 205, 206 and 207 are mounted for operation when the vehicle is in the rail travel mode, as will be explained in more detail hereinafter. Each of the flanged rail wheels 204–207 are arranged in two sets, rail wheels 204 and 205 comprising a front rail wheel set 208, and rail wheels 206 and 207 comprising a rear rail wheel set 210. The flanged rail wheels 204–207 are rotatably mounted on opposite ends of an axle 212, in the case of the front rail wheel set 208, and an axle 214, in the case of the rear rail wheel set 210, as best shown in FIG. 16. The respective axles 212 and 214 may be mounted by suitable springs and shock absorbers 215 to the frame 202 of the vehicle.

Each of the rail wheel sets 208 and 210 is driven, via drive shafts 216 and 217, respectively, as best shown in FIG. 16. A power output connection (not shown) from a transmission (not shown) is coupled to a drop box 218 and suitable universal joints 220 couple the drive shafts 216 and 217 to the drop box 218 at one end and to differentials on each axle 212 and 214 on the other end, such as differential 222 as shown in FIG. 16, to drive the rail wheel sets 208 and 210 when the vehicle is in the rail travel mode.

The vehicle 200 also includes a front ground wheel set 224 and a rear ground wheel set 226.

The front ground wheel set 224 preferably comprises a pair of pneumatic rubber tires 227 and 228, as best shown in FIG. 16. The front ground wheel set 224 preferably constitutes the powered or driving wheels in this embodiment. Each of these tires or ground wheels 227 and 228 in this embodiment is preferably powered by drive chains 230 and 232, as best shown in FIG. 16. The drive chains 230 and 232 extend between the front rail wheel axle 212 and sprockets 233 on the respective wheels 227 and 228. Although the drive chains 230 and 232 are shown in this embodiment, it will be understood that individual hydrostatic motors, as described in the previous embodiments, may be employed in lieu of such chains to drive the tires 227 and 228. However, the need for such independent drive power as provided by such hydrostatic motors is not as important in this embodiment as in the previously described embodiments because, where the front ground wheel set 224 is powered off of the rail wheel axle 212 as shown in this embodiment, these ground wheels are able to take advantage of the differential action of differential 222.

The rear ground wheel set 226 also preferably comprises a pair of pneumatic rubber tires 235 and 236, as best shown in FIG. 16. The rear ground wheel set 226 preferably constitutes the steering wheels of the vehicle as in the last described embodiment. As such, these wheels or tires 235 and 236 are coupled together by a tie rod 238, as best shown in FIG. 16, which is linked to each of the ground wheels by a suitable steering linkage 240. The tie rod 238 is coupled, via a suitable steering mechanism (not shown), to the vehicle steering wheel (not shown) in the cab 242 of vehicle 200.

In this third embodiment a pair of hydraulic cylinders 244 and a single hydraulic cylinder 246 are provided for raising and lowering the front ground wheel set 224 and the rear ground wheel set 226, respectively, as best shown in FIG. 16. Although a pair of cylinders 244 is shown to operate the front ground wheel set 224 and a single cylinder 246 is shown to operate the rear ground wheel set 226, it will be understood that the number of these cylinders may vary. One end of the pair of cylinders 244 is pivotally mounted to the frame 202 and the cylinders 244 are coupled, via piston rods 248 and crank arms 250, to the front ground wheel set 224. One end of the cylinder 246 is also pivotally mounted to the frame 202 and the cylinder 246 is coupled, via a piston rod 252 and crank arm 254, to the rear ground wheel set 226 for raising and lowering that ground wheel set.

The vehicle 200 is powered by a suitable prime mover, such as a motor or engine (not shown) contained within the cab structure 242. The engine not only provides the power for propelling and driving the rail wheel sets 208 and 210 via drop box 218, but also provides power for the hydraulic system, as well as for the electrical system. The power train to the rail wheels will not be described to an extent further than it has already been described because the details of such drive train do not form an important part of the present invention.

Railcar couplers 256 and 258, which are preferably hydraulically operated, are also carried upon the frame 202 of the vehicle 200 at each end of the vehicle. These couplers 256 and 258 are, again, of the jacking type, as have previously been described for raising and lowering the coupling and railcar (not shown) which is coupled thereto for transferring a substantial portion of the weight of the railcar to the vehicle 200 and its rail wheels 204–207 to increase the tractive effort. The construction and operation of the couplers 254 and 256 will not be described further in detail herein, reference being made to the aforementioned U.S. Pat. Nos. 4,067,259 and 4,167,142 for details of suitable couplers.

Description of the Mechanical Operation of the Third Embodiment

The vehicle 200 is shown in FIG. 15 in its rail travel mode. In this mode, hydraulic fluid is ported to both the cylinders 244 and the cylinder 246 so as to retract the pistons in the cylinders and their rods 248 and 252 to elevate both the front ground wheel set 224 and the rear ground wheel set 246. When these ground wheel sets have been elevated, the vehicle 200, which has previously been positioned with its rail wheels 204–207 in overlying alignment with the track rails 50, will come to rest upon the rail wheels, as shown in FIG. 15.

The vehicle 200 may now be propelled in the rail travel mode along the track rails 50 until one of its couplers 256 or 258 is positioned adjacent a railcar (not shown) which is to be moved. The coupling is made with the railcar and the appropriate railcar coupling 256 or 258 is elevated so as to lift or jack the end of the railcar so that a substantial portion of the weight of the railcar is now supported upon the vehicle 200. The vehicle 200 is then moved along the rails 50 on the rail wheel sets 208 and 210 until the railcar has been moved so that it is located in its desired position.

Figure 17:
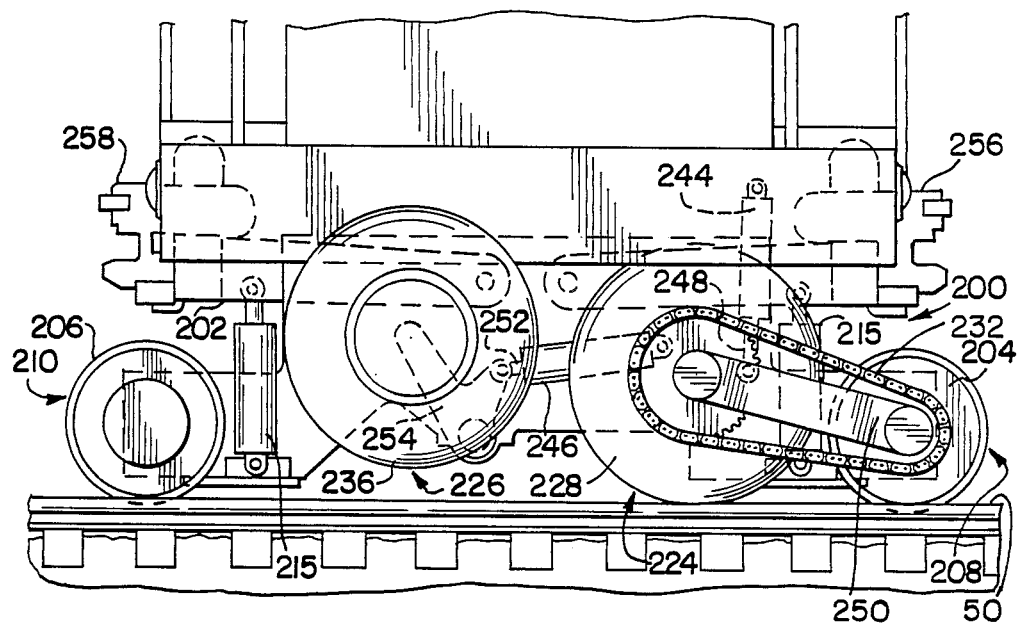
FIG. 17 is a partially broken side elevational view of the third embodiment of railcar moving vehicle, similar to the view shown in FIG. 15, but in which the vehicle is shown in the rail traction assist travel mode of operation.

If difficulty is encountered in moving the railcar due to insufficient tractive effort of the rail wheels 204–207 alone, the vehicle 200 may be shifted to the rail traction assist travel mode, as shown in FIG. 17. In this condition, hydraulic fluid, again under less than full hydraulic pressure as will be described in more detail to follow, is admitted to the pair of cylinders 244 to cause the pistons in the cylinders to move outwardly and extend the piston rods 248 so as to rotate the front wheel set 224 downwardly, via crank arms 250, until the front wheel set tires 227 and 228 are in contact with the top surface of the rails 50, as shown in FIG. 17, rather than with the track rail bed as described in the preceding embodiments. Again, the force exerted by the cylinders 244 is less than would normally be exerted to lift rail wheel sets 208 and 210 from the rails, the latter of which occurs in the ground travel mode yet to be described. However, the force exerted by the ground wheel set 224 is sufficient to exert a substantial force against the surfaces of rails 50 so that the tires 227 and 228 will frictionally engage the rails, as shown in FIG. 17.

If power is already being transmitted to the front rail wheel set 208, as it would be in the rail travel mode, the front ground wheel set 224 is already rotating when it engages the rail surface in this rail traction assist travel mode. This is because the front ground wheel set is powered by way of the chains 230 and 232 from the front rail wheel set axle 212. When the tires 227 and 228 are in contact with the rail surface with a sufficient force to avoid slipping, they will provide the necessary assistance in the tractive effort to propel the vehicle 200 on the rails and to move the vehicle with its railcar or cars.

When this additional tractive effort is no longer necessary, the vehicle 200 may again be returned to its rail travel mode by retracting the pistons in cylinders 244, thus, retracting the front ground wheel set 224 to the upper position shown in FIG. 15.

In this embodiment it is not quite as important to provide for the encountering of obstacles by the front ground wheel set 224 during movement of the vehicle 200 in the rail traction assist travel mode because the elevation of the surfaces of the rails 50 is substantially uniform over the course of travel of the vehicle. However, if an obstacle is encountered, such as for example a crossing roadway, which may be of an elevation somewhat higher than the rail surfaces, the lowered front wheel set will still automatically yield and elevate to follow such obstacle while continuing to provide tractive effort while riding over the surface of the obstacle, as has been previously described in the preceding embodiments.

Once the railcar which is being moved has been located at its desired location, the coupler 256 or 258 which supports the railcar is lowered until the weight of the railcar is again fully supported upon the track rails 50 and not upon the vehicle. The vehicle 200 is then moved away from the railcar.

Figure 18:
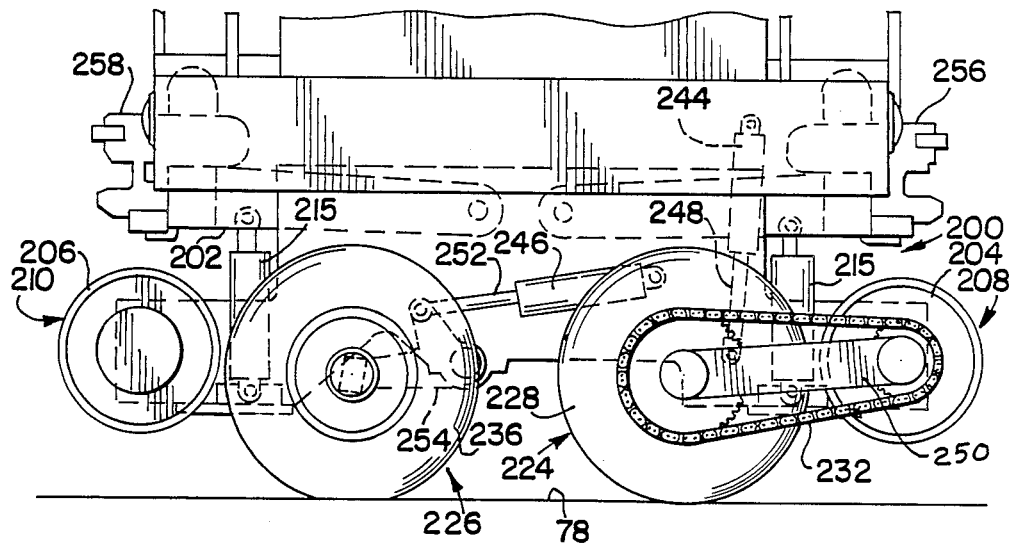
FIG. 18 is a partially broken side elevational view of the third embodiment of railcar moving vehicle similar to the views shown in FIGS. 15 and 17, but in which the vehicle is shown in its ground travel mode of operation.

If it is desired to position the vehicle 200 on another set of track rails for movement of a new railcar on those tracks, the vehicle may be shifted to its ground travel mode, as shown in FIG. 18.

In this ground travel mode, full hydraulic pressure is applied to both the cylinders 244 and the cylinder 246 to fully extend their piston rods 248 and 252, respectively, from the cylinders causing the crank arms 250 and 254 to rotate both the front ground wheel set 224 and the rear ground wheel set 226, respectively, to their downward positions, as shown in FIG. 18. In these positions, the vehicle 200 is supported entirely upon the ground wheel sets 224 and 226 and the rail wheel sets 208 and 210 are elevated as shown. Once the vehicle 200 is fully supported upon the ground wheel sets, the front ground wheel set 224 may be powered by way of the drop box 218, drive shaft 216, differential 222, rail wheel axle 212 and drive chains 230 and 232 to propel the vehicle on a conventional roadway or the like 78, as shown in FIG. 18, to its new location. The vehicle is maneuvered to the new track by steering the rear ground wheel set 226 as necessary.

Once the vehicle 200 has been positioned at the new track rails on which the vehicle is to now be operated, the vehicle is again shifted to its rail travel mode, as shown in FIG. 15, and as previously described.

The Electrical and Hydraulic Circuitry

Preferred embodiments of electrical and hydraulic control circuits which may be employed to operate any or all of the aforementioned railcar moving vehicle embodiments are schematically shown in FIGS. 19-21. The control circuitry in FIG. 19 is shown in the ground travel mode, in FIG. 20 in the rail travel mode, and in FIG. 21 in the rail traction assist travel mode. In each of these figures the electrical portion of the control circuitry is substantially shown in the dot and dash box in the drawings denoted by the reference numeral 300 and the hydraulic portion is substantially shown in the dot and dash box denoted by the reference numeral 400. The electrical control components are generally denoted by the 300 series of reference numerals, while the hydraulic control components are denoted generally by reference numerals in the 400 series.

The electrical portion of the control circuit 300 shown in FIGS. 19-21 includes a source of power 302 which is connected to a three pole switch 304 having switching contacts 304A, 304B and 304C. The electrical circuit also includes four multicontact relay switches 306, 308, 310 and 312. Relay switch 306 includes a pair of switching contacts 306A and 306B. Relay switch 308 also includes a pair of switching contacts 308A and 308B. Relay switch 310 includes three switching contacts 310A, 310B and 310C. Relay switch 312 includes four switching contacts 312A, 312B, 312C and 312D. Finally, the electrical circuit also includes a rail traction assist switch 314.

Power may be supplied to the power source, as previously mentioned, by engine 68 in FIG. 1, 156 in FIG. 10 or the engine which is not shown in FIG. 15.

The hydraulic portion of the control circuit 400 includes a hydraulic reservoir 402 and a hydraulic pump 404. A pair of three position hydraulic spool valves 406 and 408, having straight through, blocked and crossover positions, as shown, are also provided in the hydraulic circuit. Spool valve 406 has an operating solenoid at each end, solenoid 406A moving the spool valve in one direction and solenoid 406B in the other. Spool valve 406 controls the flow of hydraulic fluid to and from the cylinder 410 and its piston 410A for raising and lowering the steering ground wheels of the vehicle. Spool valve 408 also includes a pair of operating solenoids, one at each end. Solenoid 408A moves the spool valve in one direction and solenoid 408B in the other direction. Spool valve 408 controls the flow of hydraulic fluid from and to the hydraulic cylinder 412 and its piston 412A for raising and lowering the powered or driving ground wheels of the vehicle. The flow of hydraulic fluid to cylinder 412 in the ground travel and rail traction assist travel modes is by way of a two position spool valve 414, either directly from spool valve 408 in the ground travel mode, or by way of a pressure reducing valve 416 in the rail traction assist travel mode, as will be described in more detail hereinafter. Fluid flows from cylinder 412 through spool valve 414 directly to spool valve 408 in the rail travel mode. The spool valve 414 also includes a solenoid 414A and this valve has been noted by the nomenclature "assist valve" in the drawings.

The cylinders 410 and 412 correspond to the cylinders previously described for raising and lowering the ground wheel sets of the vehicle. For example, cylinder 410, as depicted schematically in FIGS. 19–21, corresponds to the cylinders 56 for raising and lowering the front steering ground wheel set 34 as shown in FIG. 1 of the first embodiment, the cylinders 146 for raising and lowering the rear steering ground wheel set 126 as shown in FIG. 12 of the second embodiment, or the cylinders 246 for raising and lowering the rear steering ground wheel set 226 as shown in FIG. 16 of the third embodiment. The cylinder 412, as depicted schematically in FIGS. 19–21, corresponds to the cylinder 58 for raising ad lowering the rear driving ground wheel set 36 as shown in FIG. 1 of the first embodiment, the cylinders 144 for raising and lowering the front driving ground wheel set 124 as shown in FIG. 12 of the second embodiment, or the cylinders 244 for raising and lowering the front driving ground wheel set 224 as shown in FIG. 16.

The hydraulic pump 404 may be readily selected by one skilled in the art from any one of a number of suitable pumps which deliver sufficient capacity and pressure to raise and lower the ground wheels so as to support the entire weight of the vehicle in the ground travel mode. An example of a pump which is suitable may be a variable volume pump such as manufactured by Vickers and which may deliver up to 1700 psi. It will be understood of course, that various other pumps and pumps which may be capable of delivering different pressures may be employed, depending upon the weight of the vehicle, the size of its cylinders 410 and 412, or the loads to be moved.

The pressure reducing valve 416 will not be described in detail noting, again, that any one of a wide variety of hydraulic pressure reducing valves or other mechanisms may be selected by one skilled in the art. However, a few important features should be weighed in the selection of the pressure reducing valve 416. One is that the valve should reduce the maximum hydraulic line pressure delivered to it by pump 404 and maintain that pressure at the reduced predetermined level. The reduced pressure delivered to the spool valve 414 should be sufficient to maintain a substantially constant downward force upon the ground wheel set which is utilized in the rail traction assist travel mode so that the force is always sufficient to insure that these wheels will continuously frictionally engage the surface and provide the additional tractive effort. The reduced pressure should also be sufficient to minimize slippage of the ground wheels while they are providing such added tractive effort. However, the reduced pressure should not be so great as to lift the vehicle.

Another feature which should be present is that the pressure reducing valve 416 should also, in effect, constitute yielding means, which will allow the ground wheels which are providing the traction assist to yield and elevate when the wheels arrive at an obstacle, as previously described. When an obstacle is encountered, the fluid pressure in cylinder 412 will tend to quickly rise to exceed the predetermined reduced pressure being delivered by the pressure reducing valve 416. When this occurs, the pressure reducing valve 416 should be capable of quickly bleeding off this excess pressure, for example, via a bleed conduit 417, to maintain the pressure in and to cylinder 412 at its predetermined reduced pressure, thereby, causing the traction assisting ground wheel set to ride up and over the obstacle while continuing to provide the same added tractive effort on the obstacle as it previously provided before encountering the obstacle. By way of example, a downward force on each of the individual traction assisting ground wheels of about 5,000 pounds is desirable and, to achieve this force, it has been found that the pressure reducing valve 416 should deliver a predetermined reduced hydraulic pressure of, for example, approximately 300 psi.

The hydraulic pump 404 and circuitry 400 will also preferably provide the necessary hydraulic power for the steering control of the ground wheels in the ground travel mode, the operation of the hydraulic jacking couplers for coupling the vehicle to the railcar and lifting the railcar, and may also provide hydraulic driving power to the individual hydrostatic motors, such as motors 51 and 52 shown in FIG. 3, for driving the ground wheels. These last mentioned hydraulic components have not been shown in the hydraulic circuit 400 in FIGS. 19–21 for the purpose of simplicity. The connection of such additional components into the hydraulic circuitry should be within the skill of those in the art after considering the circuit disclosed herein.

The various electrical conductors, hydraulic conduits and check and other valves shown in FIGS. 19-21 have, thus far, not been assigned reference numerals in the foregoing description, but will be assigned reference numerals in the description of the operation of the electrical and hydraulic control circuits which now follows.

Description of Operation of the Electrical and Hydraulic Circuits

As previously mentioned, the electrical and hydraulic circuitry line-up for the ground travel mode is shown in FIG. 19, for the rail travel mode in FIG. 20, and for the rail traction assist travel mode in FIG. 21.

1. Ground Travel Mode

Referring first to FIG. 19, the three pole switch 304 is moved either from contact with contact 304B or 304C to the position as shown into contact with contact 304A in order to shift the operation of the vehicle to the ground travel mode. If the switch 304 was previously in contact with contact 304B, the vehicle had been in the inactive condition. This position, i.e. contact 304B, is provided for completely deenergizing the circuitry when the vehicle is inactive to prevent draining the power source. When deenergized, the solenoids of all of the spool valves 406, 408 and 414 are also deenergized and the spool valves 406 and 408 are moved by springs to their centered, blocked positions to block whatever fluid is in the cylinders in the travel mode that the vehicle was in prior to deenergization. If the switch 304 was previously in contact with contact 304C before it was moved to contact 304A, the vehicle was previously in either the rail travel or rail traction assist travel modes as will be described later.

When the switch 304 is moved into contact with contact 304A, that contact will be energized to energize conductor 316 and relay switch 308 and its contacts 308A and 308B will move to the positions shown in FIG. 19. When relay switch 308 is energized, its contact 308B closes, energizing conductor 318, normally closed contacts 310A of relay switch 310, conductor 320 and solenoid 408B of spool valve 408, to move the spool valve to the left, as viewed in FIG. 19.

When the spool valve 408 is moved to the left, full hydraulic pressure is delivered from pump 404 through conduits 418 and 420 and check valve 422, through the spool valve 408 and conduit 424 to spool valve 414, and from spool valve 414 through conduit 426 to cylinder 412. The solenoid 414A of spool valve 414 is not energized because switching contacts 312A of relay switch 312 are in the normally open position as shown in FIG. 19. The fluid entering the cylinder 412 forces the cylinder to the left, as viewed in FIG. 19, or down as shown by the arrow to move the driving ground wheels of the vehicle down into the ground travel mode position. The exhaust from the cylinder 412 returns through conduit 428, through the spool valve 408, return conduit 430 and filter 432 to the reservoir 402.

Conductor 322 is also energized from conductor 320 when switch 304 is moved to contact 304A, energizing the normally closed switching contacts 312B of relay switch 312, conductor 324 and solenoid 406B on spool valve 406. When the solenoid 406B is energized, the spool valve 406 is also moved to the left to port full hydraulic pressure from pump 404 through conduits 418 and 434, through check valve 436, spool valve 406 and conduit 438 to cylinder 410 and its piston 410A. This incoming hydraulic fluid from conduit 438 forces piston 410A to the left, as viewed in FIG. 19, to move the steering ground wheels down with full hydraulic pressure into the ground travel mode position. The cylinder 410 is exhausted through conduit 440, spool valve 406, conduit 442, return conduit 430 and filter 432 to the reservoir 402.

Thus, it will be seen that full hydraulic pressure from pump 404 is delivered to both of the ground wheel cylinders 410 and 412 to move the ground wheels down with full hydraulic pressure into the ground travel mode position and the entire vehicle will be elevated so that its rail wheels are elevated above the track rails as shown in FIGS. 6, 14 and 18.

2. Rail Travel Mode

Referring now to FIG. 20, to shift the mode of travel operation to the rail travel mode, the three pole switch 304 is moved to the position shown in FIG. 20 and into contact with switching contact 304C energizing relay switch 306, via conductor 326, and deenergizing relay switch 308.

When relay switch 306 is energized, both of its normally open switching contacts 306A and 306B are closed as shown in FIG. 20 and the now closed switch 306B and the normally closed switch 308A of relay switch 308 will be energized, the latter through conductor 328. Energization of contacts 308A will energize conductor 330, normally closed contacts 310B of relay switch 310, conductor 332 and solenoid 408A of spool valve 408 to move the spool valve to the right as shown by the arrow in FIG. 20.

Hydraulic fluid under full pressure is now delivered from the pump 404 through conduit 418, conduit 420, check valve 422, spool valve 408 and conduit 428 to the cylinder 412 to force its piston 412A to the right, as shown in FIG. 20, and up with full hydraulic pressure. When piston 412A moves up, it will lift the driving ground wheels up, thus, lowering the vehicle and its rail wheels onto the track rails.

Again, the solenoid 414A of the assist valve 414 remains deenergized due to the normally open contacts 312A of relay switch 312. Thus, the valve 414 will remain in the same position it was in during the previously described ground travel mode and as shown in FIG. 20. In this position, hydraulic fluid will be exhausted from cylinder 412 through conduit 426, spool valve 414, conduit 424, spool valve 408, return conduit 430 and filter 432 to the reservoir 402.

The energization of conductor 332 due to the closed condition of contacts 306B of relay switch 306, contacts 308A of relay switch 308 and contacts 310B of relay switch 310 will also energize conductor 334, the normally closed contacts 312C of relay switch 312, conductor 336 and the solenoid 406A of spool valve 406.

When solenoid 406A is energized, it moves spool valve 406 to the right, as viewed in FIG. 20, to port full hydraulic pressure from pump 404 through conduit 418, conduit 434, check valve 436, spool valve 406, and conduit 440 to the cylinder 410 to move its piston 410A to the right, as shown by the arrow in FIG. 20, to move the steering ground wheels up and lower the rail wheels down into contact with the rails in this rail travel mode. Hydraulic fluid is exhausted from cylinder 410 through conduit 438, spool valve 406, conduit 442, return conduit 430 and filter 432 to the reservoir 402.

Thus, it will be seen that both the driving and steering ground wheels have been lifted and are continuously held in this lifted position during the rail travel mode by full hydraulic pressure so long as switch 304 remains in the wheels "up" position shown in FIG. 20.

3. Rail Traction Assist Travel Mode

It will now be assumed that for some reason the vehicle operator finds it necessary or desirable to further increase the tractive effort in the rail travel mode. Additional tractive effort may, for example, be necessary where the load being moved is of significant weight and an upgrade is encountered.

Referring to FIG. 21, all the operator need do is to leave three pole switch 304 in its rail travel mode position (in contact with contact 304C and in the position in which it presumably was in at the time additional tractive effort became necessary) and close the traction assist switch 314. The closing of switch 314 will now energize relay switch 310 to the position shown in FIG. 21 to open its switching contacts 310A and 310B and close switching contacts 310C.

Because the three pole switch 304 still remains in contact with contact 304C, the power source 302 will continue to energize the three pole switch 304 and its contact 304C, conductor 326, and relay switch 306, as previously described, to close its switching contacts 306B. Energized closed contacts 306B will energize conductor 328, normally closed contacts 308A of deenergized relay switch 308, conductor 330 and the traction assist switch 314. However, because switch 314 has now been closed, relay switch 310 will be energized to cause its switching contacts 310B to open, as shown in FIG. 21, to deenergize conductor 332 and solenoid 408A which had previously been energized to move the spool valve 408 so as to port hydraulic fluid to cylinder 412 to lift the driving ground wheels with full hydraulic pressure in the rail travel mode. However, when the traction assist switch 314 is closed to energize relay switch 310, its normally open switch contacts 310C will now be closed as shown in FIG. 21 to energize conductor 340, the now closed switching contacts 306A of relay switch 306, conductor 342 and the solenoid 414A of the assist valve 414 to move the assist valve as shown by the arrow to the position shown in FIG. 21. The energization of conductor 342 will also energize conductor 344 and relay switch 312 to move its switching contacts to the position shown in FIG. 21, including closing normally open switching contact 312A to energize conductor 346.

Although conductor 346 is now energized, conductor 320 will not be energized due to the now open condition of the switching contacts 310A of relay switch 310. Conductor 346, however, will energize conductor 348 and solenoid 408B of spool valve 408 to move the spool valve to the left, as shown by the arrow in FIG. 21. Movement of the spool valve 408 in this direction would normally port high pressure hydraulic fluid from the pump 404 through the spool valve to cylinder 412 to move the driving ground wheels down with full hydraulic pressure as in the ground travel mode. However, the full hydraulic pressure which would otherwise pass from the pump 404 through conduit 418, conduit 420, the spool valve 408 and conduit 424 is now blocked by spool valve 414 which has previously been moved to the position as shown in FIG. 21 by the energization of solenoid 414A.

Instead, fluid from pump 404 will pass through conduit 418 to the pressure reducing valve 416 where its pressure is reduced for use in this rail traction assist travel mode. The reduced hydraulic pressure fluid leaving the pressure reducing valve 416 passes through conduit 446, spool valve 414 and through conduit 426 to the cylinder 412. This lower pressure fluid entering the cylinder 412 forces the piston 412A to the left, as shown by the arrow in FIG. 21, to move the driving wheels down, but with a force substantially less than when full hydraulic pressure is applied to the cylinder 412. Hydraulic fluid is exhausted from the cylinder 412 through conduit 428, spool valve 408, return conduit 430 and filter 432 to the reservoir 402.

As previously described in the foregoing three mechanical embodiments, only the driving ground wheels in these embodiments are lowered in the rail traction assist travel mode. The steering ground wheels preferably remain lifted in the rail traction assist travel mode. The steering wheels remain up even though switching contacts 310B and 312C of relay switches are now open because, when the traction assist switch 314 is closed, energization of the relay switch 312 will cause switching contacts 312D to close. Thereby, because conductor 344 is energized in this mode as previously mentioned, the now closed switching contacts 312A of relay switch 312 will energize conductors 346, 348 and 349, now closed switching contacts 312D of relay switch 312, conductor 336 and solenoid 406A of spool valve 406 to maintain the spool valve to the right, as shown in FIG. 21, to continue to port high pressure hydraulic fluid to the cylinder 410, as described in the rail travel mode, and keep the steering wheels elevated.

As previously mentioned, the pressure reducing valve 416, in addition to supplying the reduced pressure hydraulic fluid, also constitutes yielding means which operates to allow the ground wheels which are operating in the rail traction assist travel mode to yield to an obstacle and ride over the obstacle. When an obstacle is met, the reduced pressure to cylinder 412 will tend to rise. However, this rise in pressure is quickly dissipated by throttling it back through an orifice, such as a Venturi 448, and conduit 417 to the return conduit 430 so that the pressure supplied to cylinder 412 remains substantially constant.

EXAMPLES

The following examples are illustrative of the substantial increases in tractive effort that may be realized by the railcar moving vehicle incorporating the principles of the invention in which the ground wheels are employed in the rail traction assist travel mode of the present invention.

By way of example, it will be assumed that the weight of the vehicle itself is 25,000 pounds. It will also be assumed that to this weight is added an additional 40,000 pounds which is transferred to the vehicle by jacking of the coupled railcar which is being moved, for a total of 65,000 pounds force upon the rail wheels of the vehicle. The coefficient of friction of the steel rail wheels upon dry steel rails is about 0.3 and, thereby, the tractive effort of the rail wheels in the rail travel mode without assist is $65,000 \times 0.3 = 19,500$.

In this example, one set or two powered ground wheels will be powered into contact with a concrete track bed with a force of 5,000 pounds supported upon each of the ground wheels for a total of 10,000 pounds. Thereby, some traction will be lost by the rail wheels due to the additional support provided by the now lowered ground wheels. The tractive effort provided by the rail wheels will no longer be 19,500, but now will be $(65,000-10,000) \times 0.3 = 16,500$.

However, this loss of rail wheel tractive effort will more than be compensated by the tractive effort gained by the ground wheels in the rail traction assist travel mode. The coefficient of friction of rubber on concrete is 0.7 and is only slightly less for rubber on a gravel and tie rail bed. Thus, the tractive effort added by the lowered ground wheels is $10,000 \times 0.7 = 7,000$. This 7,000 added to the somewhat reduced tractive effort of 16,500 of the rail wheels is 23,500 an increase of 4,000 or more than 20% of the original tractive effort in the rail travel mode only.

This increase in tractive effort is also realized if the ground wheels are lowered into contact with the rails themselves with the same 5,000 pounds of force each, and even if the rails are wet. The coefficient of friction of rubber on dry and wet steel is about 0.65 and 0.42, respectively. Thus, when the ground wheels are lowered on dry rails, the tractive effort is 16,500 for the rail wheels plus $10,000 \times 0.65$ or 6,500 for the lowered ground wheels for a total of 23,000. When the ground wheels are lowered on wet rails, the tractive effort added by the ground wheels will be $10,000 \times 0.42$ or 4,200—an extremely useful addition to the tractive effort of the rail wheels alone on wet rails, where the coefficient of friction is substantially less than 0.3.

Although in the foregoing description of the preferred embodiments of the invention and the foregoing examples railcar moving vehicles are described in terms of lowering only the powered or driving ground wheel sets for the purpose of increasing tractive effort in the rail traction assist travel mode and the steering ground wheels are retained in their elevated condition, the steering ground wheels may also be powered and lowered to achieve even greater tractive effort. The steering ground wheels may be also readily provided with a source of power for this purpose by for example, the hydrostatic motors, such as motors 51 and 52 shown in FIG. 3. If the steering ground wheels are also to be lowered in the rail traction assist travel mode, some mechanism should be provided for locking these wheels in their fore and aft directions to prevent inadvertent turning of the steering wheels during this rail traction assist travel mode. Such locking mechanisms and also any changes necessary in the electrical and hydraulic circuitry to achieve four wheel traction assist should clearly be within the skill of one skilled in the art after such person has considered the foregoing description of the present invention.

It will be understood that any reference to the front and the rear of the vehicles in the foregoing description is merely for the purposes of establishing a frame of direction. In actuality, these terms should not be considered to be limiting because the vehicles may be operated with equal facility in either direction. This is certainly clear in view of the existence of the couplers on both ends of the vehicles. Thus, what may be termed the front of the vehicle when the vehicle is moving in one direction, will become the rear of the vehicle when it is moving in the opposite direction.

Although the first and second embodiments have been described in terms of the traction assist ground wheels being between and straddling the track wheels, respectively, the location of these wheels in these respective embodiments may be reversed or they may even be on the track rails as in the third embodiment and the converse is also true of the third embodiment.

It will be also understood that the preferred embodiments of the present invention which have been described are merely illustrative of only a few of the applications of the present invention. Numerous modifications may be made by those skilled in the art without departing from the true spirit and scope of the present invention.

What is claimed is:

1. A railcar moving vehicle for selective travel in a first rail travel mode on flanged rail wheels only on the rails of a railway track, in a second ground travel mode on ground wheels only, and a third rail traction assist travel mode on said flanged rail wheels and at least one of said ground wheels, said vehicle comprising a prime mover, front and rear rail wheels sets at least one set of which is powered by said prime mover, front and rear ground wheels aligned in the same direction as said rail wheels, drive means powering at least one of said front and rear ground wheels, control means for moving at least one of said front and rear rail wheels sets and said front and rear ground wheels relative to the other so as to interchangeably convert said vehicle from one of said travel modes to another of said travel modes, a coupler for detachably connecting said vehicle to a railcar, weight transfer means for transferring weight from a railcar coupled to said vehicle for providing a predetermined increased traction between the rail wheels to the railway track, moving means for shifting the vehicle to said third rail traction assist travel mode in which each of said rail wheel sets is in contact with the rails and said vehicle is powered by at least some of the rail wheel sets, and at least one of the powered ground wheels also simultaneously drivingly frictionally engages a surface with sufficient force to provide further increased traction of the vehicle, said moving means including force transmitting means operatively associated with said ground wheels, said force transmitting means biasing at least one of the powered ground wheels into engagement with the surface, said force transmitting means including hydraulic means for providing a substantialy constant contact force between said ground wheels and the surface regardless of the presence of local deformities in said surface, whereby a predetermined supplemental tractive force is provided by said at least one of said ground wheels which is over and above the increased traction provided by said weight transfer means.

2. The railcar moving vehicle of claim 1, wherein both said rail wheel sets are powered.

3. The railcar moving vehicle of claim 1, wherein at least one of said ground wheels is powered by independent hydrostatic means.

4. The railcar moving vehicle of claim 1, wherein a pair of ground wheels frictionally engage said surface in said rail traction assist travel mode, said pair of ground wheels being spaced from each other in a direction perpendicular to the direction of movement of the vehicle and both of said pair of last mentioned ground wheels are powered from at least one of said rail wheels sets by said drive means.

5. The railcar moving vehicle of claim 1, wherein the surface which is drivingly frictionally engaged by said at least one of said powered ground wheels is the bed of said railway track.

6. The railcar moving vehicle of claim 1, wherein said at least one of said powered ground wheels which drivingly frictionally engages the surface engage the bed of said railway track outside of the rails.

7. The railcar moving vehicle of claim 1, wherein the surface which is drivingly frictioinally engaged by said at least one of said powered ground wheels in the rails.

8. The railcar moving vehicle of claim 1, wherein force transmitting means include yielding for permitting said at least one of said ground wheels which drivingly frictionally engage the surface to elevate at obstacles on the surface, but to remain in frictional driving contact with the obstacles of said railway track.

9. Control means for controlling the wheel position on a railcar moving vehicle for selective travel in a first rail travel mode on the rails of a railway track on front and rear flanged rail wheel sets only at least some of which are powered, in a second ground travel mode on front and rear ground wheels only at least one of which is also powered, and a third rail traction assist travel mode on said flanged rail wheels and at least some of said ground wheels, said control means moving at least one of the front and rear flanged rail wheel sets and the front and rear ground wheels relative to the other so as to interchangeably convert the vehicle from one of said travel modes to another said travel modes, said vehicle also including a coupler for detachably connecting said vehicle to a railcar, weight transfer means for transferring weight from a railcar coupled to said vehicle for providing a predetermined traction between said rail and wheels and the railway track, said control means comprising moving means for shifting the vehicle to said third rail traction assist travel mode in which each of said rail wheel sets is in contact with the rails and said vehicle is powered by at least some of the rail wheel sets, and at least some of the powered ground wheels also simultaneously drivingly frictionally engage a surface with sufficient force to further increase the traction of the vehicle, said moving means including force transmitting means operatively associated with said ground wheels, said force transmitting means biasing at least some of the powered ground wheels into engagement with the surface, said force transmitting means including hydraulic means for providing substantially constant contact force between said ground wheels and the surface regardless of the presence of local deformities in said surface, whereby a predetermined supplemental tractive force is provided by said ground wheels which is in excess of that provided by said weight transfer means.

10. The control means of claim 9, wherein said ground wheels are moved relative to said rail wheel sets to drivingly frictionally engage the surface for increasing the traction of the vehicle when the vehicle is in said third rail traction assist travel mode.

11. The control means of claim 10, wherein said force transmitting means includes force reducing means for reducing the force with which said powered ones of the ground wheels drivingly frictionally engage the surface from the force which is exerted by the ground wheels upon the ground when the vehicle is in said second ground travel mode.

12. The control means for claim 11, also including yielding means for permitting said ground wheels which drivingly frictionally engage the surface to elevate upon contact with obstacles on the surface while still remaining in frictional driving contact therewith.

13. The control means of claim 12, wherein both said force reducing means and said yielding means comprise hydraulic pressure reducing means.

14. The control means of claim 11, wherein said force reducing means comprise hydraulic pressure reducing means.

15. The control means of claim 11, wherein said means for moving said rail wheel sets and ground wheels relative to each other to said third rail traction assist travel mode includes said force reducing means.

16. The control means of claim 12, wherein said means for moving said rail wheel sets and ground wheels relative to each other to said third rail traction assist travel mode includes both said force reducing means and said yielding means.

17. In a vehicle for travel on flanged rail wheels on the rails of a railway track, said vehicle including a prime mover and front and rear rail wheel sets at least one of which is powered by said prime mover, a coupler for detachably connecting said vehicle to a railcar and weight transfer means of transmitting weight from a railcar coupled to said vehicle for providing a predetermined increased traction between said rail wheels and the railway track, wherein the improvement in said vehicle comprises: at least one wheel in addition to the rail wheel sets; drive means for powering said wheel; and, moving means for moving shifting the vehicle to a rail traction assist travel mode in which each of said rail wheel sets is in contact with the rails and said vehicle is powered by at least some of the rail wheel sets, and the powered additional wheel also simultaneously drivingly frictioinally engages a surface with sufficient force to further increase the traction of the vehicle, said moving means including force transmitting means operatively associated with said additional wheel, said force transmitting means biasing said additional wheel into engagement with the surface, said force transmitting means including hydraulic means for providing a substantially constant contact force between said additional wheel and the surface regardless of the presence of local deformities in said surface, whereby a predetermined supplemental tractive force is provided by said additional wheel which is in excess of that provided by said weight transfer means.

18. The vehicle of claim 17, wherein the surface which is drivingly frictionally engaged is the bed of said railway track.

19. The vehicle of claim 17, wherein said additional wheel which drivingly frictionally engages the surface engages the bed of said railway track outside of the rails.

20. The vehicle of claim 17, wherein the surface which is drivingly frictionally engaged by said additional wheel is the rails.

* * * * *